(12) United States Patent
Zhuang

(10) Patent No.: US 11,193,756 B2
(45) Date of Patent: Dec. 7, 2021

(54) OBJECT SHAPE MEASUREMENT APPARATUS AND METHOD

(71) Applicant: SONY CORPORATION, Tokyo (JP)

(72) Inventor: Tuo Zhuang, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,845

(22) PCT Filed: Dec. 6, 2018

(86) PCT No.: PCT/JP2018/045004
§ 371 (c)(1),
(2) Date: Jun. 8, 2020

(87) PCT Pub. No.: WO2019/124104
PCT Pub. Date: Jun. 27, 2019

(65) Prior Publication Data
US 2020/0393238 A1    Dec. 17, 2020

(30) Foreign Application Priority Data
Dec. 20, 2017  (JP) .............................. JP2017-243552

(51) Int. Cl.
*G01B 11/06* (2006.01)
*G01B 11/25* (2006.01)

(52) U.S. Cl.
CPC .......... *G01B 11/06* (2013.01); *G01B 11/2518* (2013.01); *G01B 11/2545* (2013.01)

(58) Field of Classification Search
CPC .............. G01B 11/06; G01B 11/2518; G01B 11/2545; G01B 11/0658; G16H 30/20
(Continued)

(56) References Cited

U.S. PATENT DOCUMENTS 5,235,400 A * 8/1993 Terasawa ............ G03F 7/70866
250/559.08
6,108,090 A * 8/2000 Ishihara ................ G01B 11/24
356/601
(Continued)

FOREIGN PATENT DOCUMENTS

CN    103930749 A    7/2014
EP      2766693 A1    8/2014
(Continued)

OTHER PUBLICATIONS

Miyazaki, et al., "Estimating Surface Shape of Transparent Objects By Using Polarization Raytracing Method", Computer Science Graduate School of Information Science and Technology The University of Tokyo, Japan, Jul. 2004, 16 pages.
(Continued)

*Primary Examiner* — Isiakao O Akanbi
(74) *Attorney, Agent, or Firm* — Chip Law Group

(57) ABSTRACT

Provided are an apparatus and method for measuring the shape and thickness of a transparent object. A light projecting section that outputs beams of light to a transparent object, a light receiving sensor that receives the beams of light that have passed through the transparent object, and a data processing section that analyzes a received light signal in each light receiving element of the light receiving sensor are included. The light projecting section outputs, in parallel, output beams of light from a plurality of light sources, and the data processing section analyzes the received light signal in each light receiving element of the light receiving sensor and identifies a light source of any beam of light input into one light receiving element by using light source combination information that is stored in a storage section and that corresponds to a value of the received light signal.

15 Claims, 18 Drawing Sheets

(58) Field of Classification Search
USPC ....... 356/600, 601, 630, 485, 908, 355, 357, 356/381, 503
See application file for complete search history.

(56) References Cited

U.S. PATENT DOCUMENTS

| | | | |
|---|---|---|---|
| 6,975,410 B1* | 12/2005 | Sturgill | G01B 11/06 356/631 |
| 2002/0044283 A1* | 4/2002 | Kuroiwa | G01B 11/06 356/369 |
| 2010/0020070 A1* | 1/2010 | Hart | G16H 30/20 345/419 |
| 2011/0144505 A1* | 6/2011 | Yamamoto | A61B 5/0064 600/476 |
| 2011/0228052 A1* | 9/2011 | Ohnishi | G01B 11/245 348/47 |
| 2011/0262007 A1* | 10/2011 | Kojima | G01N 21/8806 382/103 |
| 2012/0056994 A1 | 3/2012 | Fyffe | |
| 2013/0016815 A1 | 1/2013 | Odinak et al. | |
| 2013/0169966 A1 | 7/2013 | Shchegrov et al. | |
| 2016/0156899 A1* | 6/2016 | Higo | G01B 11/2545 348/48 |

FOREIGN PATENT DOCUMENTS

| | | |
|---|---|---|
| JP | 03-142303 A | 6/1991 |
| JP | 08-136252 A | 5/1996 |
| JP | 2000-055626 A | 2/2000 |
| JP | 2002-098650 A | 4/2002 |
| JP | 2002-513463 A | 5/2002 |
| JP | 2008-151559 A | 7/2008 |
| JP | 2010-151803 A | 7/2010 |
| JP | 2014-531023 A | 11/2014 |
| JP | 2016-109671 A | 6/2016 |
| JP | 2018-105891 A | 7/2018 |
| KR | 10-2014-0075002 A | 6/2014 |
| TW | 201321729 A | 6/2013 |
| WO | 2012/030815 A2 | 3/2012 |
| WO | 2013/055906 A1 | 4/2013 |

OTHER PUBLICATIONS

Qian, et al., "3D Reconstruction of Transparent Objects With Position-Normal Consistency", 2016 IEEE Conference on Computer Vision and Pattern Recognition (CVPR), 2016, pp. 4369-4377.

International Search Report and Written Opinion of PCT Application No. PCT/JP2018/045004, dated Mar. 5, 2019, 09 pages of ISRWO.

Miyazaki, et al., "Estimating Surface Shape of Transparent Objects By Using Polarization Raytracing Method", Computer Science Graduate School of Information Science and Technology The University of Tokyo, Japan, Jul. 2004, 6 pages.

* cited by examiner

FIG. 10

| | OBSERVED FEATURE AMOUNTS (OUTPUT OF LIGHT RECEIVING ELEMENT) | COMBINATIONS OF LIGHT SOURCES |
|---|---|---|
| (1) | I1 | (L1) |
| ... | ... | ... |
| (m) | Im | (Lp, Lq) |
| ... | ... | ... |
| (n) | In | (Ll, Lm, Ln) |
| ... | ... | ... |

FIG. 17

| | OBSERVED FEATURE AMOUNTS (COLOR, BRIGHTNESS, POLARIZATION DIRECTION) | COMBINATIONS OF LIGHT SOURCES |
|---|---|---|
| (1) | I1 | (L1) |
| ⋮ | ⋮ | ⋮ |
| (m) | Im | (Lp, Lq) |
| ⋮ | ⋮ | ⋮ |
| (n) | In | (Ll, Lm, Ln) |
| ⋮ | ⋮ | ⋮ |

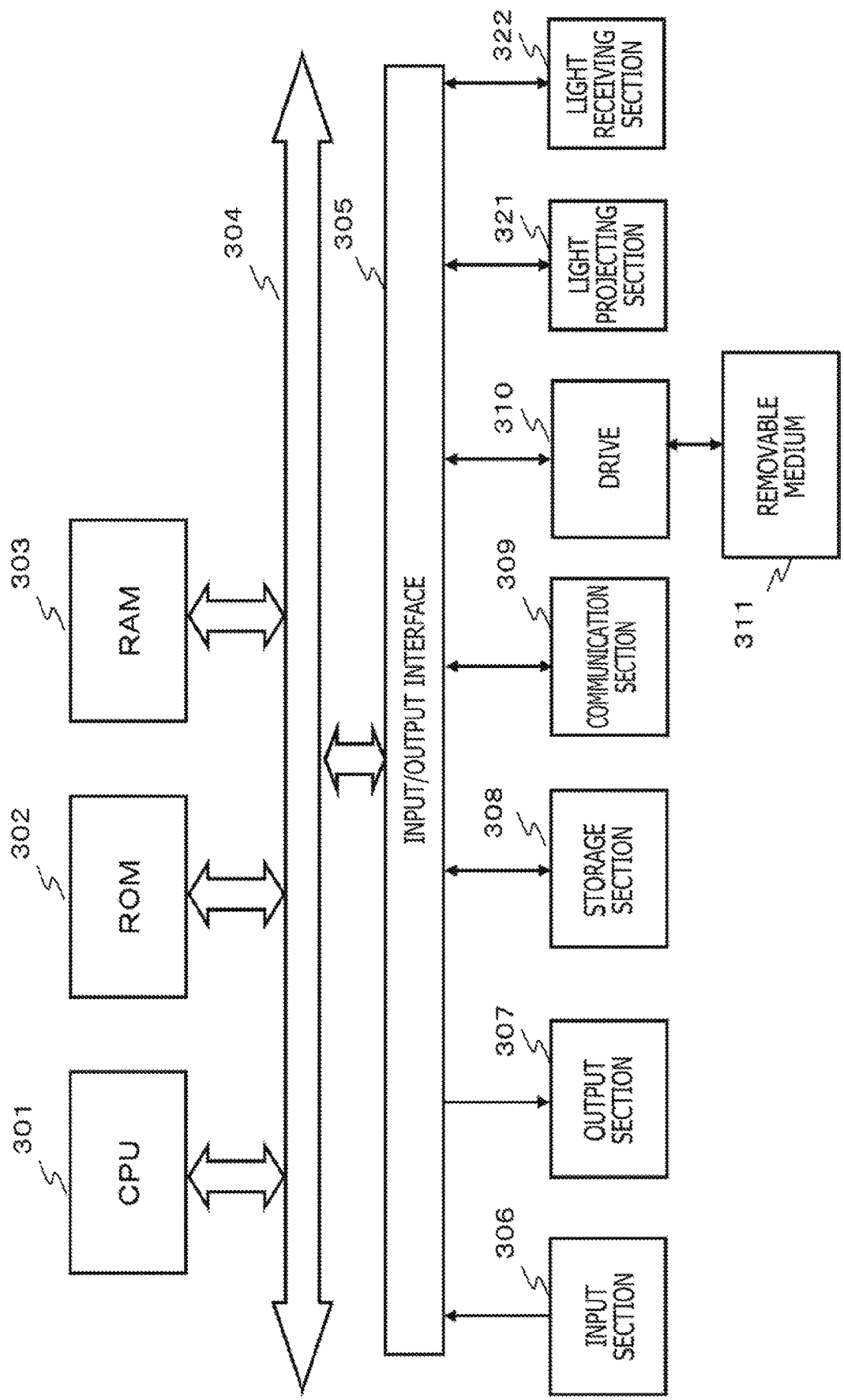

OBJECT SHAPE MEASUREMENT APPARATUS AND METHOD

CROSS REFERENCE TO RELATED APPLICATIONS

This application is a U.S. National Phase of International Patent Application No. PCT/JP2018/045004 filed on Dec. 6, 2018, which claims priority benefit of Japanese Patent Application No. JP 2017-243552 filed in the Japan Patent Office on Dec. 20, 2017. Each of the above-referenced applications is hereby incorporated herein by reference in its entirety.

TECHNICAL FIELD

The present disclosure relates to an object shape measurement apparatus and method, and a program. Specifically, the present disclosure relates to an object shape measurement apparatus and method, and a program for analyzing the three-dimensional shape of a transparent object.

BACKGROUND ART

In a case where the surface shape of an object, that is, the three-dimensional shape of an object is measured, a process of irradiating the object to be measured with light from a specific direction and analyzing light reflected off the surface of the object is performed, for example.

However, in a case where the object to be measured is a transparent object that transmits light, it is difficult to perform such a process using reflected light.

For example, the following document is available as a document that discloses a process of measuring the surface shape of a transparent object.

NPL 1 (Daisuke Miyazaki and Katsushi Ikeuchi, "Estimating Surface Shape of Transparent Objects by using Polarization Raytracing Method," Meeting on Image Recognition and Understanding (MIRU 2004) July 2004) discloses a configuration for measuring the surface shape of a transparent body. To enable the measurement, an identical surface is irradiated with polarized beams of light from a plurality of directions and the polarization directions of a plurality of reflected beams of light from the surface of the transparent target object are analyzed.

In this system, in order to distinguish polarized beams of light from various directions, illuminations in a plurality of directions are sequentially turned on.

Further, NPL 2 (Yiming Qian with two others, "Mi3D Reconstruction of Transparent Objects with Position-Normal Consistency," [online], [searched on Dec. 1, 2017], Internet <URL: https://pdfs.semanticscholar.org/0ea6/96f0a6217272a0f0797638c49e47f67f9ef4.pdf#search=%273d+reconstruction+of+transparent%27>) discloses a configuration including a background with specific patterns and a camera. The background is provided on one side of a transparent target object, and the camera is provided in the opposite direction thereof. With this configuration, the shape is estimated by analyzing shape-attributed distortions, which are generated when beams of light from the background pass through the transparent target object.

In this analysis process, it is necessary to measure the shape by separating beams of light from a plurality of background patterns that have transmitted through the object and that have been incident on the same pixel of the camera. Thus, it is necessary to perform a process of rotationally moving the patterns and the camera a plurality of times around the object to be measured in the spatial direction.

Further, PTL 1 (Japanese Patent Laid-Open No. 2002-098650) discloses a configuration for detecting the presence of a transparent body by utilizing the fact that the amount of a specific polarization direction becomes small depending on the refractive index of the transparent body.

In a case where there is a transparent foreign matter attached to a target object, the amount of attenuation of the above amount becomes different due to a difference in refractive index. Therefore, the transparent foreign matter can be detected as a defect. Further, assuming that the shape of the detection target is smooth, a steep shape change occurs at a location with a shape defect. Therefore, the amount of attenuation of the above amount rapidly changes, which makes detection possible.

Further, PTL 2 (National Publication of International Patent Application No. 2002-513463) discloses a configuration for inspecting a molding defect by observing the stress of a molded transparent glass product.

Internal refractive index distribution varies depending on the degree of the applied force (stress) when a transparent body is molded. The varying refractive indexes cause spatial variation in gray values when a transmitted beam of light having a specific polarization direction is observed in two dimensions. Utilizing this phenomenon, the stress applied to the transparent scenery is inspected, and at the same time, edge information of the target object is extracted from the light quantity received by a two-dimensional sensor and is used for the inspection of the molding defect.

Moreover, PTL 3 (Japanese Patent Laid-Open No. 2010-151803) discloses a configuration for detecting defects inside a transparent body.

The following different three types of defects can be identified as defects:
  Defect 1: shape defects such as scratches (scattering light)
  Defect 2: foreign matter (blocking light)
  Defect 3: stress defects (changing refractive index)
  Specifically, beams of light of three colors from two directions are emitted. A beam of light of one color is emitted from the vertical direction relative to a camera optical axis, while a polarized beam of light and beams of light of two colors are emitted from the parallel direction. The beam of light from the vertical direction detects the defect 1, while the beams of light from the parallel direction detect the defect 2 (using colors) and the defect 3 (using polarization).

CITATION LIST

Non Patent Literature

[NPL 1]
Daisuke Miyazaki and Katsushi Ikeuchi, "Estimating Surface Shape of Transparent Objects by using Polarization Raytracing Method," Meeting on Image Recognition and Understanding (MIRU 2004) July 2004
[NPL 2]
Yiming Qian with two others, "Mi3D Reconstruction of Transparent Objects with Position-Normal Consistency," [online], [searched on Dec. 1, 2017], Internet <URL: https://pdfs.semanticscholar.org/0ea6/96f0a6217272a0f0797638c49e47f67f9ef4.pdf#search=%273d+reconstruction+of+transparent%27>

Patent Literature

[PTL 1]
Japanese Patent Laid-Open No. 2002-098650
[PTL 2]
National Publication of International Patent Application No. 2002-513463
[PTL 3]
Japanese Patent Laid-Open No. 2010-151803

SUMMARY

Technical Problem

The above NPL 1 and NPL 2 disclose the configurations for measuring the surface shape of a transparent target object. However, the configuration described in NPL 1 needs a process of sequentially turning on illuminations at a plurality of different positions. Further, the configuration described in NPL 2 needs a process of moving the position of the illumination a plurality of times. These processes take an enormous amount of time in measurement and, moreover, need a complicated measurement system.

Further, the configurations described in PTL 1, PTL 2, and PTL 3 only disclose configurations for detecting the presence or absence of a transparent target object or defects thereof using polarization and do not disclose the measurement of the three-dimensional shape including both the front and back surfaces of an object to be measured.

The present disclosure has been made in view of the above problems, for example. An object of the present disclosure is to provide an object shape measurement apparatus and method, and a program that can measure the shape of the surface of an object, that is, the three-dimensional shape of an object without changing relative positions between the object to be measured and a proof term in a case where the object to be detected is an object with high light transmittance.

In a configuration according to an embodiment of the present disclosure, an object is to provide an object shape measurement apparatus and method, and a program that can identify the positions of illuminations without spatially moving the illuminations and that can simultaneously measure the surface shape and thickness of a transparent target object from changes in the states of polarized beams of light by using both the illuminations, which sequentially change their polarization directions according to a specific sequence, and a polarization sensor, which can simultaneously obtain polarized beams of light in four directions.

A first aspect of the present disclosure lies in an object shape measurement apparatus including:

a light projecting section configured to output beams of light to a transparent object whose shape is to be measured;

a light receiving sensor including a plurality of light receiving elements configured to receive output beams of light that have been output from the light projecting section and that have passed through the transparent object; and a data processing section configured to analyze a received light signal in each of the light receiving elements of the light receiving sensor, in which the light projecting section outputs, in parallel, output beams of light from a plurality of light sources, and the data processing section performs a process of analyzing the received light signal in each of the light receiving elements of the light receiving sensor and identifying a light source of any beam of light input into one light receiving element by using light source combination information that is stored in a storage section and that corresponds to a value of the received light signal.

Further, a second aspect of the present disclosure lies in a light source identification method performed by an object shape measurement apparatus, the object shape measurement apparatus including a light projecting section including a plurality of light sources configured to output beams of light to a transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the light source identification method comprising:
by the data processing section,
performing a process of identifying a light source of any beam of light input into one light receiving element of the light receiving sensor by referring to a reference table recording correspondence data between values of received light signals in the light receiving elements and light source identifiers.

Further, a third aspect of the present disclosure lies in a transparent object shape calculation method that is a method for calculating a shape of a transparent object, the transparent object shape calculation method being performed by an object shape measurement apparatus, the object shape measurement apparatus including a light projecting section including a plurality of light sources configured to output beams of light to the transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the transparent object shape calculation method including:
by the data processing section,
calculating the shape of the transparent object by calculating a Mueller matrix representing a change in a state of a polarized beam of light output from each of the light sources of the light projecting section and calculating, from matrix elements of the Mueller matrix, a zenith angle and an azimuth angle of a surface normal to each divided region on both front and back surfaces of the transparent object.

Further, a fourth aspect of the present disclosure lies in a program that causes an object shape measurement apparatus to perform a light source identification process, the object shape measurement apparatus including a light projecting section including a plurality of light sources configured to output beams of light to a transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the program causing the data processing section to perform a process of identifying a light source of any beam of light input into one light receiving element of the light receiving sensor by referring to a reference table recording correspondence data between values of received light signals in the light receiving elements and light source identifiers.

Further, a fifth aspect of the present disclosure lies in a program that causes an object shape measurement apparatus to perform a process of calculating a shape of a transparent object, the object shape measurement apparatus including a light projecting section including a plurality of light sources configured to output beams of light to the transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the program causing the data processing section to calculate the shape of the transparent object by calculating a Mueller matrix representing a change in a state of a polarized beam of light output from each of the light sources of the light projecting section and calculating, from matrix elements of the Mueller matrix, a zenith angle and an azimuth angle of a surface normal to each divided region on both front and back surfaces of the transparent object.

It is noted that the program according to the present disclosure is, for example, a program that can be provided by a storage medium or a communication medium that provides various program codes in a computer readable form to an information processing apparatus or a computer system that can execute those various program codes. By providing such a program in the computer readable form, processes corresponding to the program are performed on the information processing apparatus or the computer system.

Still other objects, features and advantages of the present disclosure will become apparent from the detailed description based on embodiments of the present invention to be described later and attached drawings. It is noted that, in the present specification, a system refers to a configuration in which a plurality of apparatuses is logically grouped and is not limited to a configuration in which individually configured apparatuses are provided in the same housing.

Advantageous Effects of Invention

According to the configuration of an embodiment of the present disclosure, an apparatus and method for measuring the shape and thickness of a transparent object are implemented.

Specifically, for example, a light projecting section configured to output beams of light to a transparent object, a light receiving sensor configured to receive the beams of light that have passed through the transparent object, and a data processing section configured to analyze a received light signal in each light receiving element of the light receiving sensor are included. The light projecting section outputs, in parallel, output beams of light from a plurality of light sources, and the data processing section analyzes the received light signal in each light receiving element of the light receiving sensor and identifies a light source of any beam of light input into one light receiving element by using light source combination information that is stored in a storage section and that corresponds to a value of the received light signal. Moreover, shapes of both front and back surfaces of the transparent object are calculated by calculating a Mueller matrix representing a change in a state of a polarized beam of light output from each of the light sources of the light projecting section.

With this configuration, the apparatus and method for measuring the shape and thickness of a transparent object are implemented.

It is noted that the effects described in the present specification are merely examples and are not limited. Further, additional effects may be provided.

BRIEF DESCRIPTION OF DRAWINGS

FIG. 10 is a diagram for describing an example of a reference table that is used for the process of measuring the shape of a transparent object.

FIG. 17 is a diagram for describing an example of a reference table that is used for the process of measuring the shape of a transparent object.

FIG. 18 is a diagram for describing an example of a hardware configuration of the object shape measurement apparatus.

DESCRIPTION OF EMBODIMENT

Hereinafter, an object shape measurement apparatus and method, and a program according to the present disclosure will be described in detail with reference to the drawings. It is noted that the description will be made according to the following items.

1. Regarding Process of Measuring Shape of Transparent Object Using Polarization
2. Regarding Process of Measuring Thickness of Transparent Object
3. Regarding Configuration of Object Shape Measurement Apparatus that Measures Shape and Thickness of Transparent Object
4. Regarding Other Embodiments
5. Regarding Example of Hardware Configuration of Object Shape Measurement Apparatus
6. Summary of Configuration of Present Disclosure

1. Regarding Process of Measuring Shape of Transparent Object Using Polarization First, a process of measuring the shape of a transparent object using polarization will be described with reference to FIG. 1 and subsequent figures.

Figure 1:
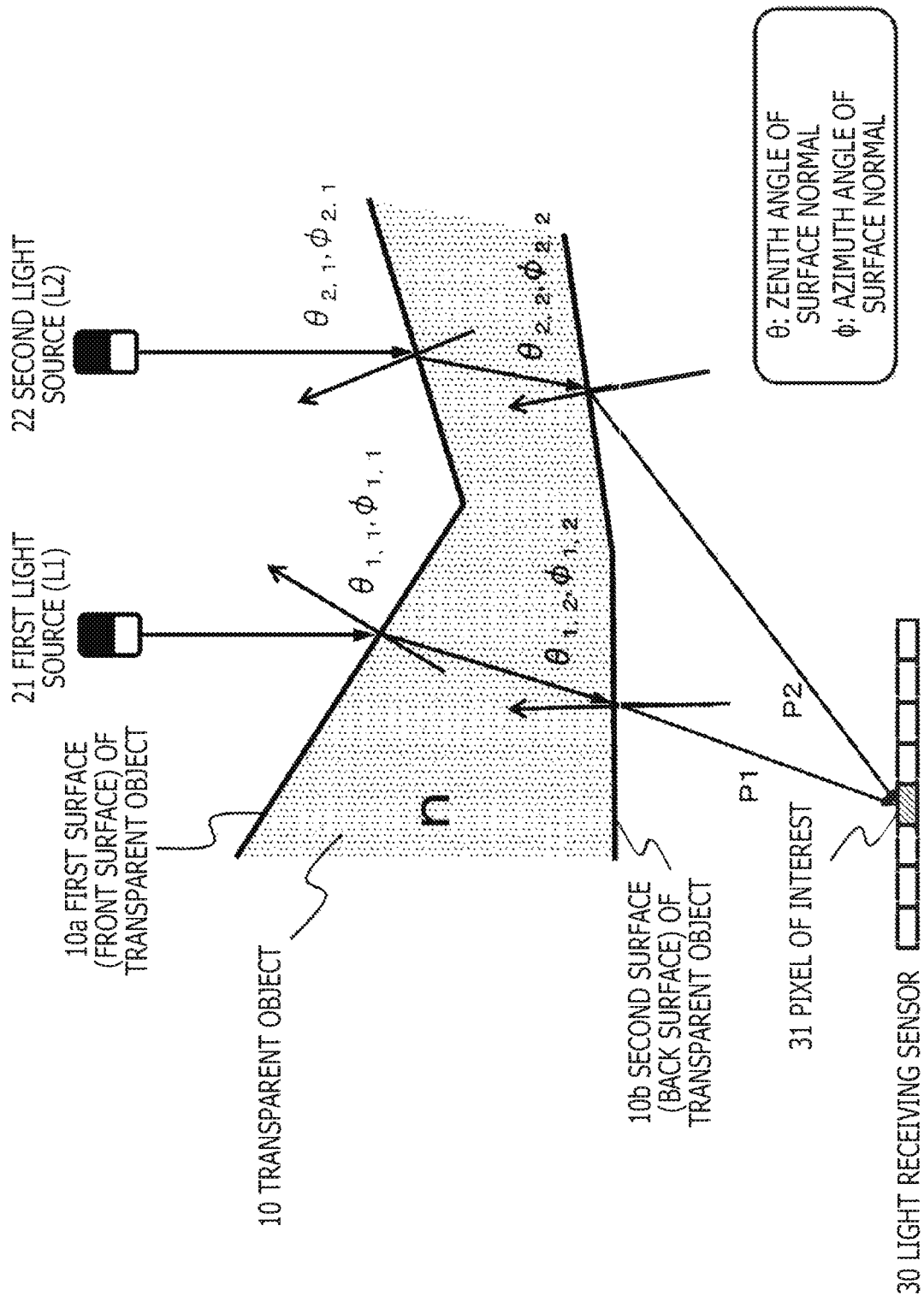
FIG. 1 is a diagram illustrating an example of a configuration of a process of measuring the shape of a transparent object.

FIG. 1 illustrates a transparent object 10, which is an object whose shape is to be measured.

The transparent object 10 is a transparent object with a refractive index of n and has a first surface (front surface) 10a and a second surface (back surface) 10b.

A plurality of light sources placed on the first surface (front surface) 10a side of the transparent object 10, that is, a first light source L1, 21 and a second light source L2, 22 irradiates the first surface (front surface) 10a of the transparent object 10 with beams of light.

The irradiation beams of light from the plurality of light sources, the first light source L1, 21 and the second light source L2, 22, pass through the transparent object 10 and are received by a light sensor 30, which is placed on the second surface (back surface) 10b side of the transparent object 10.

The directions in which the irradiation beams of light from the respective light sources travel are changed according to the refractive index and shape of the transparent object 10, that is, the surface shapes of the first surface (front surface) 10a and the second surface (back surface) 10b.

Beams of light incident on a pixel of interest 31 in the light sensor 30 illustrated in FIG. 1 are two beams of light P1 and P2 illustrated in the figure.

The beam of light that has been emitted from the first light source L1, 21, incident on the first surface (front surface) 10a of the transparent object 10, refracted, and then exited from the second surface (back surface) 10b of the transparent object 10 is the incident beam of light P1, which is a constituent element of the beams of light incident on the pixel of interest 31 of the light sensor 30.

Moreover, the beam of light that has been emitted from the second light source L2, 22, incident on the first surface (front surface) 10a of the transparent object 10, refracted, and then exited from the second surface (back surface) 10b of the transparent object 10 is the incident beam of light P2, which is another constituent element of the beams of light incident on the pixel of interest 31 of the light sensor 30.

In a case where the light quantity of light incident on the pixel of interest 31 of the light sensor 30, that is, the received light quantity is assumed to be I', the received light quantity I' can be expressed by the following (Formula 1).

[Math. 1]

$$I' = \sum_{i=1}^{N} T_i(\theta_{i,1}, \phi_{i,1}, \theta_{i,2}, \phi_{i,2}) \cdot I_i \quad \text{(Formula 1)}$$

It should be noted that, in the above (Formula 1),
I' represents a received light quantity,
$\theta_{i,1}$ and $\phi_{i,1}$ respectively represent the zenith angle and azimuth angle of the surface normal to the i-th front surface region of the first surface (front surface) 10a of the transparent object 10, which is an object to be measured, and
$\theta_{i,2}$ and $\phi_{i,2}$ respectively represent the zenith angle and azimuth angle of the surface normal to the i-th back surface region of the second surface (back surface) 10b of the transparent object 10, which is an object to be measured.
$I_i$ represents a feature amount of a light source that emits a beam of light that is incident on the i-th front surface of the first surface (front surface) 10a of the transparent object 10, which is an object to be measured.
N represents the number of light sources.
T represents a transfer function (Mueller matrix) that represents a change caused by light passage through the transparent object 10, which is an object to be measured.

It is noted that the Mueller matrix T is a matrix that represents a change in the state of polarization when an incident beam of light is transmitted through the transparent object 10, which is an object to be measured, and is set for each light source i=1 to N so as to correspond to each light source.

The Mueller matrix Ti corresponding to a light source i has the following elements as elements of the matrix:
$\theta_{i,1}$ and $\phi_{i,1}$ (the zenith angle and azimuth angle of the surface normal to the i-th front surface region of the first surface (front surface) 10a of the transparent object 10, which is an object to be measured)
$\theta_{i,2}$ and $\phi_{i,2}$ (the zenith angle and azimuth angle of the surface normal to the i-th back surface region of the second surface (back surface) 10b of the transparent object 10, which is an object to be measured)

It is noted that the i-th front surface region of the first surface (front surface) 10a of the transparent object 10 is set so as to correspond to each light source i.

Figure 2:
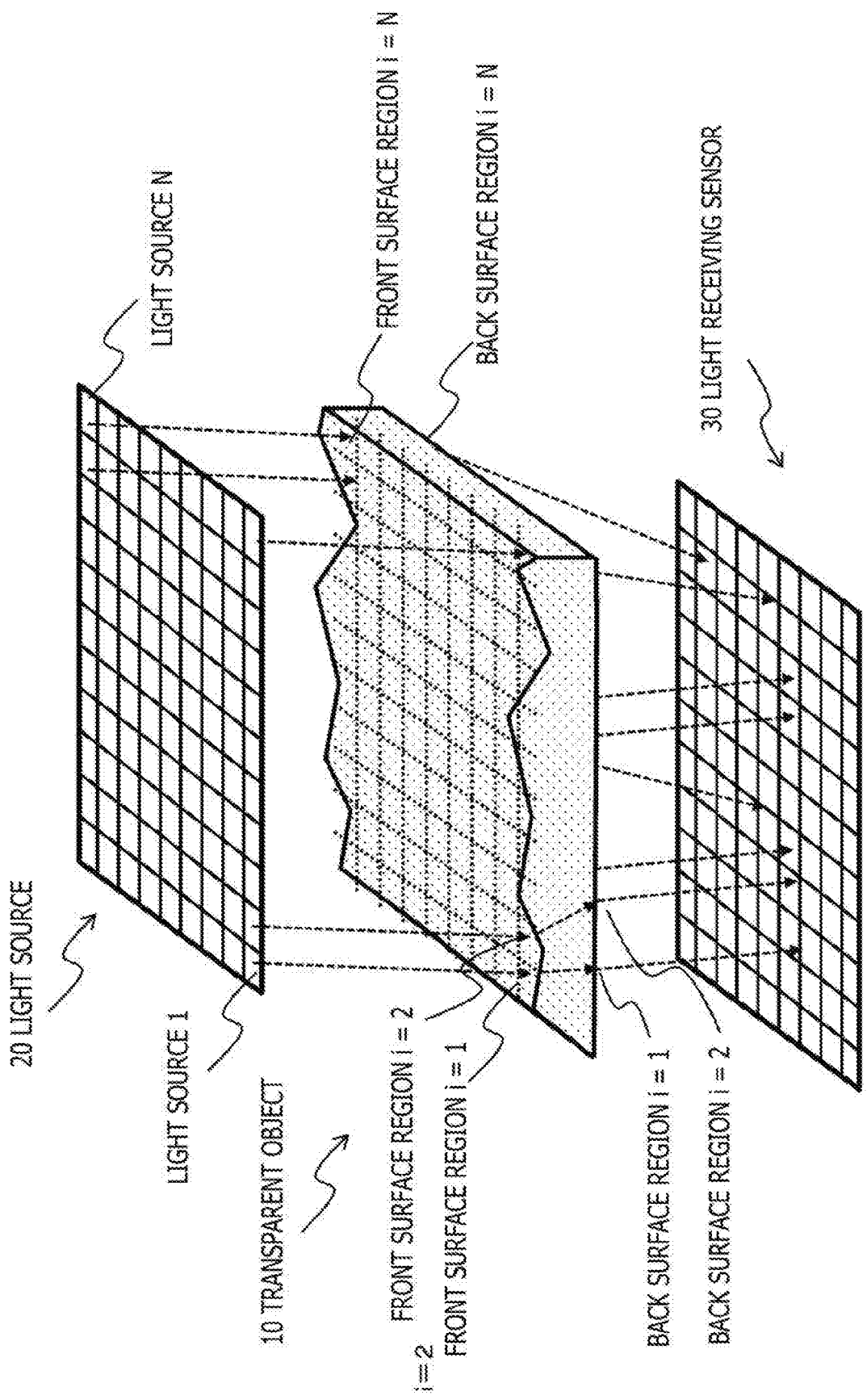
FIG. 2 is a diagram for describing an example of a configuration of a shape measurement apparatus according to the present disclosure.

Specifically, for example, as illustrated in FIG. 2, in a case where N light sources i=1 to N included in a light source 20 are set, the first surface (front surface) 10a of the transparent object 10 placed in the light output directions of the N light sources is divided, on a plane perpendicular to the light output directions, into N regions whose number is similar to the number of light sources, and each of the divided regions corresponding to the respective light sources i=1 to N is defined as a front surface region i.

Further, the position at which a beam of light input into the front surface region i is output from the second surface (back surface) 10b of the transparent object 10 is defined as the i-th back surface region of the second surface (back surface) 10b.

It is noted that although the details will be described later, the calculation of the shapes of the front and back surfaces of the transparent object 10 is performed for each region. This shape calculation is performed on the basis of a feature amount of an output beam of light from each light source and a feature amount of a received light signal in each sensor element of the light receiving sensor 30, which receives output beams of light from the second surface (back surface) 10b of the transparent object 10.

Therefore, it is preferable that the individual regions irradiated with output beams of light from the respective N light sources correspond to the individual N divided regions of the first surface (front surface) 10a of the transparent object 10.

Therefore, it is preferable that the light source 20 and the transparent object 10 are placed in as small distance as possible and as close proximity as possible to prevent the regions irradiated with the output beams of light from the respective N light sources from largely diffusing.

This is also the case with the distance between the light receiving sensor 30 and the transparent object 10. It is preferable that the light receiving sensor 30 and the transparent object 10 are placed in as small distance as possible and as close proximity as possible.

It is noted that the feature amount $I_i$ of each light source specifically represents a setting mode of a polarized beam of light output from the corresponding light source, for example. A specific example of control of a polarized beam of light output from each light source will be described later.

In a case where the above (Formula 1) is expressed using
the matrix T including Mueller matrices $T_1, T_2, \ldots T_N$ that are respectively set so as to correspond to the respective light sources i=1 to N, and
the matrix I including light source feature amounts $I_1, I_2, \ldots I_N$ that correspond to the respective light sources i=1 to N,
the above (Formula 1) can be expressed as the following (Formula 2).

$$I' = T \cdot I \quad \text{(Formula 2)}$$

I' in the above (Formula 2) corresponds to I' in (Formula 1) described above. That is,
I' represents a received light quantity.
In the above (Formula 2), the matrix T and the matrix I respectively represent the following matrices:

$$T = [T_1, T_2, \ldots, T_N]$$

$$I = [I_1, I_2, \ldots, I_N]^T$$

According to the above (Formula 2),
the matrix T can be obtained by the following Formula (Formula 3).

$$T = I' \cdot I^{-1} \quad \text{(Formula 3)}$$

In order to calculate the above (Formula 3), the feature amount of each light source is changed a plurality of times (M times) so that the rank (rank number) of the matrix I becomes sufficient, and the received light quantities as observed values: $I'_1$ to $I'_M$ are obtained. By setting a relational expression between the received light quantities I' and the matrix T in the following Formula (Formula 4), the matrix T can be obtained by the least square method to which (Formula 3) or (Formula 4) is applied.

$$[I'_1, I'_2 \ldots I'_M] = T \cdot [I_1, I_2 \ldots I_M] \quad \text{(Formula 4)}$$

It is noted that each of the Mueller matrices $T_1, T_2, \ldots T_N$, which are the constituent elements of the matrix T, is a collection of the zenith angle θ and the azimuth angle φ of the surface normal to each region of the first surface (front surface) 10a and the second surface (back surface) 10b of the transparent object 10, which is an object to be measured. Therefore, the shapes of the front and back surfaces of the transparent object 10 can be obtained by obtaining the matrix T.

As described above, the feature amount $I_i$ of each light source specifically represents the setting mode of a polarized beam of light output from the corresponding light source, for example.

In a case where the above (Formula 1) is rewritten using each value of the followings in the above (Formula 1) as a feature amount indicating a polarization characteristic, the above (Formula 1) can be expressed as a relational expression such as (Formula 5) below.

I' (=a received light quantity)

$I_i$ (=a feature amount of a light source that emits a beam of light that is incident on the i-th front surface of the first surface (front surface) 10a of the transparent object 10, which is an object to be measured)

[Math. 2]

$$\begin{bmatrix} I' \\ I'_{90} \\ I'_{45} \end{bmatrix} = \sum_{i=1}^{N} T(\theta_{i,1}, \phi_{i,1}, \theta_{i,2}, \phi_{i,2}, n) \cdot \begin{bmatrix} I_i \\ I_{i,90} \\ I_{i,45} \end{bmatrix} \quad \text{(Formula 5)}$$

It is noted that each of the matrices including three elements represents a Stokes vector that represents the state of polarization of light. The three elements represent the respective values of the followings in the above (Formula 5):

I' (=a received light quantity)

$I_i$ (=a feature amount of a light source that emits a beam of light that is incident on the i-th front surface of the first surface (front surface) 10a of the transparent object 10, which is an object to be measured)

Further, n represents a refractive index of the transparent object 10.

It is noted that the Stokes vector corresponding to I' (=a received light quantity) is a Stokes vector that represents the state of polarization of a beam(s) of light that has(have) passed through the transparent object 10 and that has(have) been detected by the light receiving sensor 30, which receives beams of light that have passed through the transparent object 10.

The first component=I' represents the average light quantity of a beam of light that has passed through the transparent object 10.

The second component=$I'_{90}$ represents a 90°-directional polarization component of the beam(s) of light that has (have) passed through the transparent object 10.

The third component=$I'_{45}$ represents a 45°-directional polarization component of the beam(s) of light that has (have) passed through the transparent object 10.

Further, the Stokes vector corresponding to $I_i$ (=a feature amount of a light source that emits a beam of light that is incident on the i-th front surface of the first surface (front surface) 10a of the transparent object 10, which is an object to be measured) is a Stokes vector that represents the state of polarization of a beam of light incident on the transparent object 10, that is, an output beam of light i that is output from the light source i.

The first component=$I_i$ represents the average light quantity of an output beam of light from the light source i (=a beam of light incident on the region i of the transparent object 10).

The second component=$I_{i,90}$ represents a 90°-directional polarization component of the output beam of light from the light source i (=the beam of light incident on the region i of the transparent object 10).

The third component=$I_{i,\,45}$ represents a 45°-directional polarization component of the output beam of light from the light source i (=the beam of light incident on the region i of the transparent object 10).

As described above with reference to (Formula 1), T included in the above (Formula 5) represents the Mueller matrix corresponding to a transfer function that represents a change caused by light passage through the transparent object 10, which is an object to be measured.

The Mueller matrix T includes, as elements, data of the zenith angle θ and the azimuth angle φ of the surface normal to each region of the first surface (front surface) 10a and the second surface (back surface) 10b of the transparent object 10, which is an object to be measured. The shapes of the front and back surfaces of the transparent object 10 can be obtained by obtaining the matrix T.

By transforming (Formula 1) into (Formula 5), available information increases to three of the average light quantity, the 90°-directional polarization component, and the 45°-directional polarization component. This makes it possible to perform a process using three times as much information as (Formula 1). This allows, as a result, accurate estimation of the surface shape of the transparent object 10.

It is noted that in order to calculate the surface shape of the transparent object 10 on the basis of the above (Formula 5), a calculation formula for T is derived according to a procedure similar to (Formula 2) and (Formula 3) described above. That is, $$I'=T \cdot I \quad \text{(Formula 2)}$$

$$T=I' \cdot I^{-1} \quad \text{(Formula 3)}$$

In the above (Formula 2) and (Formula 3), the matrix T and the matrix I respectively represent the following matrices:

$$T=[T_1, T_2, \ldots, T_N]$$

$$I=[I_1, I_2, \ldots, I_N]^T$$

It is noted that an element $I_i$ of the matrix I represents a feature amount of a light source that emits a beam of light that is incident on the i-th front surface of the first surface (front surface) 10a of the transparent object 10, which is an object to be measured. In a case where (Formula 5) is used, the element $I_i$ of the matrix I represents a Stokes vector that represents the state of polarization of an output beam of light i that is output from the light source i.

The first component=$I_i$ represents the average light quantity of an output beam of light from the light source i (=a beam of light incident on the region i of the transparent object 10).

The second component=$I_{i,\,90}$ represents a 90°-directional polarization component of the output beam of light from the light source i (=the beam of light incident on the region i of the transparent object 10).

The third component=$I_{i,\,45}$ represents a 45°-directional polarization component of the output beam of light from the light source i (=the beam of light incident on the region i of the transparent object 10).

These values are known.

Meanwhile, I' represents a received light quantity in the above (Formula 2) and (Formula 3). In a case where (Formula 5) is used, I' represents a Stokes vector corresponding to I' (=a received light quantity).

That is, I' represents a Stokes vector that represents the state of polarization of a beam(s) of light that has(have) passed through the transparent object 10 and that has(have) been detected by the light receiving sensor 30, which receives beams of light that have passed through the transparent object 10. I' represents a matrix including the following components as the elements.

The first component=I' represents the average light quantity of a beam(s) of light that has(have) passed through the transparent object 10.

The second component=$I'_{90}$ represents a 90°-directional polarization component of the beam(s) of light that has (have) passed through the transparent object 10.

The third component=$I'_{45}$ represents a 45°-directional polarization component of the beam(s) of light that has (have) passed through the transparent object 10.

The matrix includes these components.

These values need to be calculated from the sensor output of the light receiving sensor 30 in the configuration illustrated in FIGS. 1 and 2.

However, the problem here is that light incident on each element included in the light receiving sensor 30 is not necessarily a beam of light from one of the N light sources illustrated in FIGS. 1 and 2.

N beams of light emitted from the respective N light sources illustrated in FIGS. 1 and 2 change their courses in various directions according to the shape and refractive index of the transparent object when passing through the transparent object 10.

As a result, the light incident on each element included in the light receiving sensor 30 may be, in some cases, a combination of output beams of light from a plurality of light sources among the N light sources illustrated in FIGS. 1 and 2.

Figure 3:
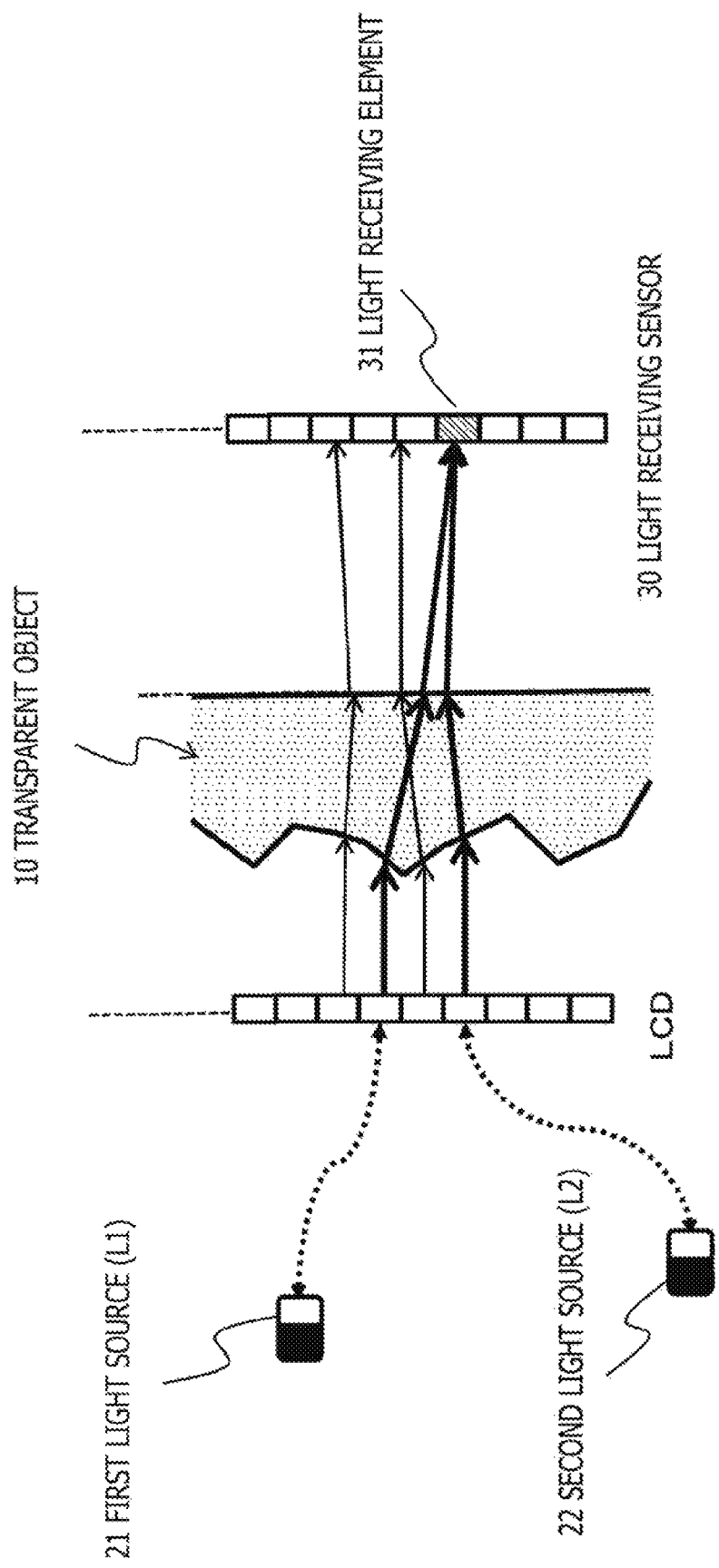
FIG. 3 is a diagram for describing an example in which output beams of light from a plurality of light sources are input into one light receiving element of a light receiving sensor.

For example, as illustrated in FIG. 3, the setting may be, in some cases, such that an output beam of light from the first light source (L1) 21 and an output beam of light from the second light source (L2) 22 change their courses when passing through the transparent object 10, and are input into one light receiving element 31 of the light receiving sensor 30.

In such a case, in order to calculate the shape of the transparent object 10 using the above (Formula 5), it is necessary to discriminate which light source(s) (i) a beam(s) of light input into each element of the light receiving sensor 30 has(have) been input from.

In a case where the shape of the transparent object 10 is calculated using the above (Formula 5), the process of calculating $T=[T_1, T_2, \ldots, T_N]$ including the Mueller matrices Ti and then calculating the following elements, which are the constituent elements of each of the Mueller matrices Ti as the elements of the matrix T, is performed.

$\theta_{i,\,1}$ and $\phi_{i,\,1}$ (the zenith angle and azimuth angle of the surface normal to the i-th front surface region of the first surface (front surface) 10a of the transparent object 10, which is an object to be measured)

$\theta_{i,\,2}$ and $\phi_{i,\,2}$ (the zenith angle and azimuth angle of the surface normal to the i-th back surface region of the second surface (back surface) 10b of the transparent object 10, which is an object to be measured)

For this process, it is necessary to identify the parameter i in (Formula 5).

This means that it is necessary to identify I' in (Formula 5), that is, identify which beam(s) of light from light source(s) the light incident on each element included in the light receiving sensor 30 includes.

Therefore, for example, as illustrated in FIG. 3, in a case where the light input into each element of the light receiving sensor 30 is a combination of beams of light from the plurality of light sources, a process of identifying the plurality of light sources (i) is necessary.

In order to make this identification possible, the polarization modes of the N light sources are controlled during a process according to the present disclosure.

Hereinafter, the process of controlling polarizations of the light sources according to the present disclosure will be described.

The process of controlling polarizations of the light sources according to the present disclosure uses polarization phases. That is, the polarization phases of the respective light sources i=1 to N are changed with different change rates in the time direction.

By performing this polarization control, it is possible to identify which beam(s) of light from light source(s) the light incident on each element included in the light receiving sensor 30 includes.

An example of the process of controlling polarizations of the light sources according to the present disclosure will be described with reference to FIG. 4.

Figure 4:
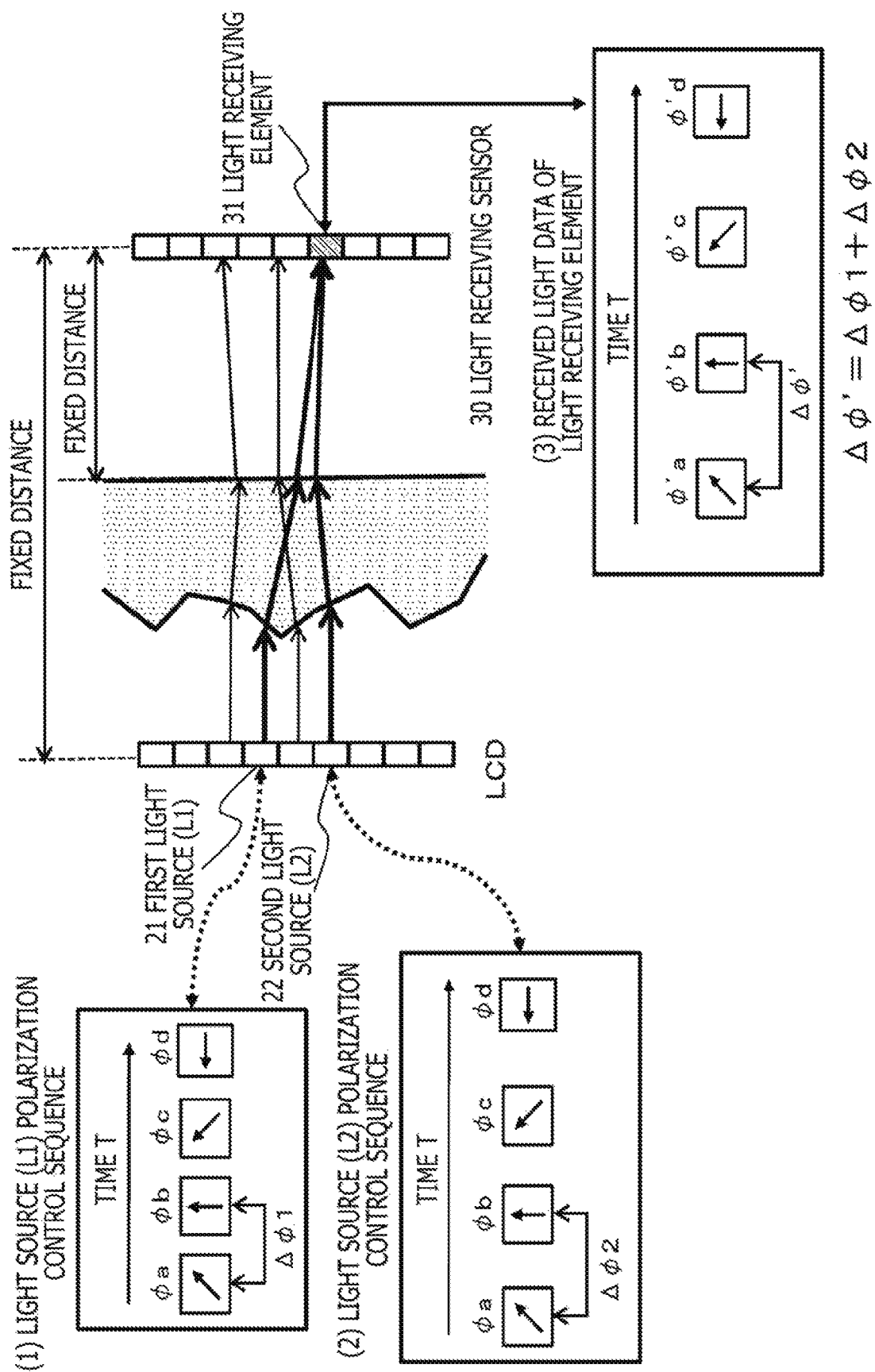
FIG. 4 is a diagram for describing a process for enabling identification of light sources in a case where output beams of light from the plurality of light sources are input into one light receiving element of the light receiving sensor.

As in the case of FIG. 3, FIG. 4 illustrates an example of settings in which an output beam of light from the first light source (L1) 21 and an output beam of light from the second light source (L2) 22 change their courses when passing through the transparent object 10 and are input into one light receiving element 31 of the light receiving sensor 30.

Here, the polarization control for each of the first light source (L1) 21 and the second light source (L2) 22 is set as illustrated in the figure. That is, (1) First light source (L1) polarization control sequence, and (2) Second light source (L2) polarization control sequence are set as illustrated in FIG. 4.

Each of "(1) first light source (L1) polarization control sequence" and "(2) second light source (L2) polarization control sequence" is a polarization direction control sequence that sequentially changes the polarization direction to one of four types of polarization directions (45°, 0°, 135°, and 90°).

It is noted that in the example illustrated in the figure, (ϕa) the setting at an arrow pointing in the upper right direction means polarization at 45°, (ϕb) the setting at an arrow pointing in the upper direction means polarization at 0°, (ϕc) the setting at an arrow pointing in the upper left direction means polarization at 135°, and (ϕd) the setting at an arrow pointing in the left direction means polarization at 90°.

The process according to the present disclosure varies the speed at which each light source changes its polarization direction. That is, polarization control is performed with phases shifted from each other.

As for the control of the four types of polarization directions (45°, 0°, 135°, and 90°) in (1) first light source (L1) polarization control sequence, the time interval at which the polarization direction changes by 45° is assumed to be $\Delta\phi 1$.

That is, in the example illustrated in the figure, the time at which the polarization direction changes from 45° to 0° is $\Delta\phi 1$, the time at which the polarization direction changes from 0° to 135° is also $\Delta\phi 1$, and the time at which the polarization direction changes from 135° to 90° is also $\Delta\phi 1$.

Meanwhile, as for the control of the four types of polarization directions (45°, 0°, 135°, and 90°) in (2) second light source (L2) polarization control sequence, the time interval at which the polarization direction changes by 45° is assumed to be $\Delta\phi 2$ ($\neq \Delta\phi 1$).

That is, in the example illustrated in the figure, the time at which the polarization direction changes from 45° to 0° is $\Delta\phi 2$, the time at which the polarization direction changes from 0° to 135° is also $\Delta\phi 2$, and the time at which the polarization direction changes from 135° to 90° is also $\Delta\phi 2$.

As described above, polarization control is performed with the settings that vary the time at which the state of a polarized beam of light from each light source changes. In this manner, even in a case where polarized beams of light from a plurality of light sources are input into one light receiving element of the light receiving sensor 30, it is possible to analyze a received light signal therein and identify the light sources of light included in the received light signal.

It is noted that it is not essential to vary the polarization control modes of the plurality of light sources included in the light source 20. It is sufficient if at least adjacent light sources are set to be in different polarization control modes.

That is, light sources positioned apart from each other may be in the same polarization control mode. This is because there is a low possibility that beams of light from the light sources positioned apart from each other pass through the transparent object and are input into the same light receiving element.

Figure 5:
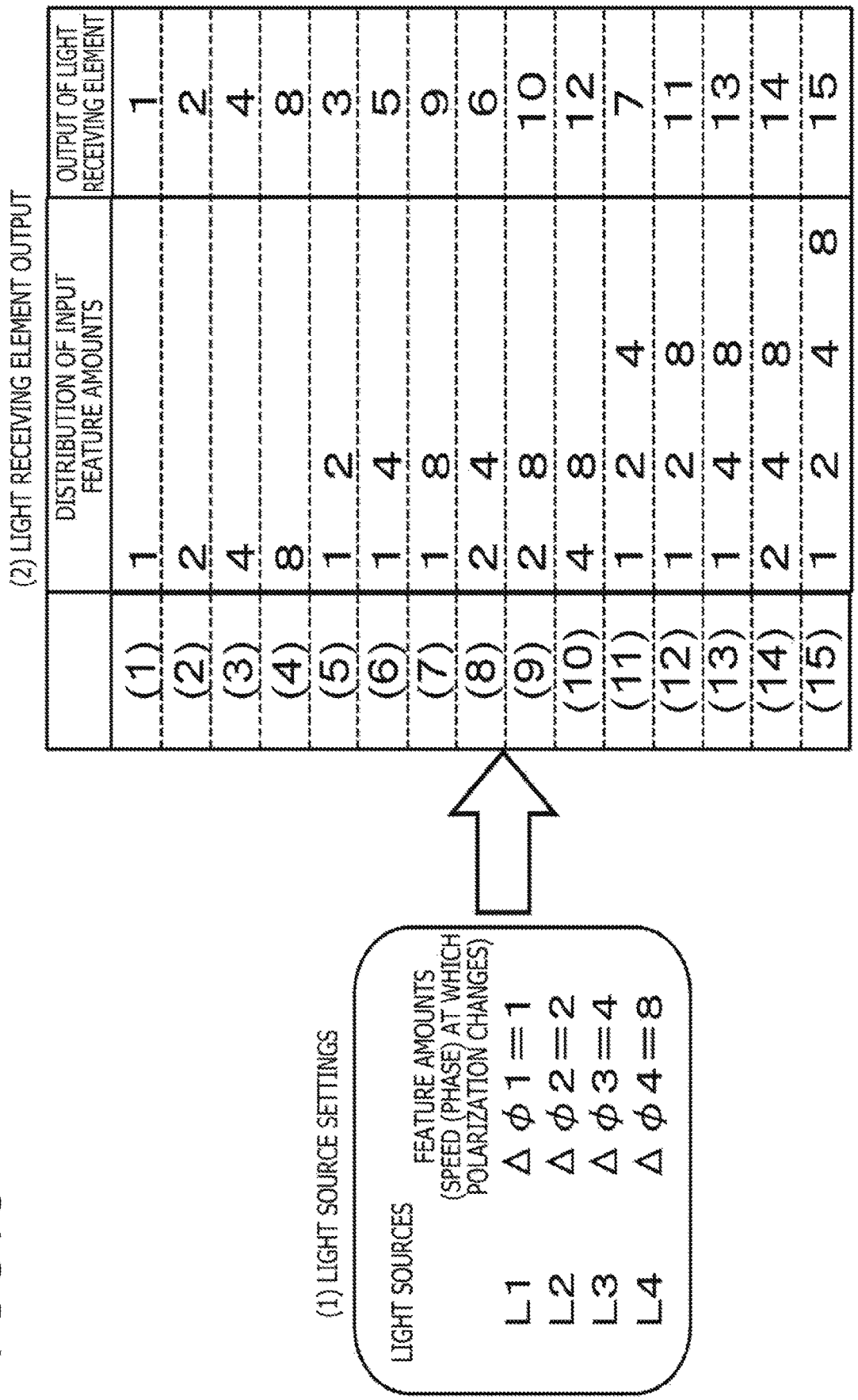
FIG. 5 is a diagram for describing the process for enabling identification of light sources in a case where output beams of light from a plurality of light sources are input into one light receiving element of the light receiving sensor.

With reference to FIG. 5, a description will be given of the process that can identify a plurality of light sources in a case where a combination of beams of light from the plurality of light sources is included in a received light signal in one light receiving element.

FIG. 5 illustrates four light sources (L1 to L4) and the output level (photoelectric conversion result) of one light receiving element in a case where at least one of output beams of light from these four light sources is input into the light receiving element of the light receiving sensor 30.

As illustrated in (1) light source settings in FIG. 5, the four light sources (L1 to L4) change their respective polarizations at different speeds (phases).

The time interval at which the light source L1 changes its polarization direction by 45° is assumed to be $\Delta\phi 1$.

The time interval at which the light source L2 changes its polarization direction by 45° is assumed to be $\Delta\phi 2$.

The time interval at which the light source L3 changes its polarization direction by 45° is assumed to be $\Delta\phi 3$.

The time interval at which the light source L4 changes its polarization direction by 45° is assumed to be $\Delta\phi 4$.

It is noted that $\Delta\phi 1 \neq \Delta\phi 2 \neq \Delta\phi 3 \neq \Delta\phi 4$.

The speed (phase) at which polarization changes is the feature amount that is unique to each light source.

(2) Light receiving element output in FIG. 5 illustrates the output level (photoelectric conversion result) of one light receiving element in a case where at least one of output beams of light from these four light sources is input into the light receiving element of the light receiving sensor 30.

(2) Light receiving element output in FIG. 5 illustrates 15 entries (1) to (15).

These 15 entries correspond to all the combinations for a case where one or more output beams of light output from the light sources (L1) to (L4) are input into one light receiving element.

For example, the entry (1) is an example for a case where only an output beam of light from the light source (L1) is input.

The entry (2) is an example for a case where only an output beam of light from the light source (L2) is input.

The entry (5) is an example for a case where output beams of light from the light sources (L1) and (L2) are input.

The entry (5) is an example for a case where output beams of light from the light sources (L1) and (L2) are input.

The entry (11) is an example for a case where output beams of light from the light sources (L1), (L2), and (L3) are input.

The entry (15) is an example for a case where output beams of light from the light sources (L1), (L2), (L3), and (L4) are input.

The output levels (photoelectric conversion results) of the light receiving element for these 15 types of input modes are all different values.

That is, it is possible to discriminate which combination of (1) to (15) applies by acquiring the output level (photoelectric conversion result) of the light receiving element.

In this manner, in the process according to the present disclosure, polarization control is performed with the settings that vary the speed (phase) at which each light source changes polarization. As a result, it is possible to identify a light source of any beam of light input into one light receiving element of the light receiving sensor.

It should be noted that in order to enable the light source identification process in this manner, the settings need to satisfy the following conditions.

For a total of M illuminations, the number of subsets each including arbitrary n (n≤M) illuminations among the M illuminations is expressed by the following (Formula 6).

[Math. 3]

$$\sum_{i=1}^{n} {}_nC_i \qquad \text{(Formula 6)}$$

Here, the feature amount of the j-th illumination is assumed to be I (j), and the maximum feature amount of all the illuminations is assumed to be $I_{max}$.

[Math. 4]

$$\sum_{i=1}^{n} I(t) < I_{max}$$

$$\text{where } t = [{}_nC_i]$$

The settings need to satisfy the above formula.

In order to enable the light source identification process according to the process described with reference to FIG. 5, the settings need to satisfy the above conditions.

It is noted that the example illustrated in FIG. 5 is given by way of example and is an example illustrating a case where the feature amount is a geometric progression.

A sequence for measuring the shape of a transparent object according to the process of the present disclosure will be described with reference to a flowchart illustrated in FIG. 6.

Figure 6:
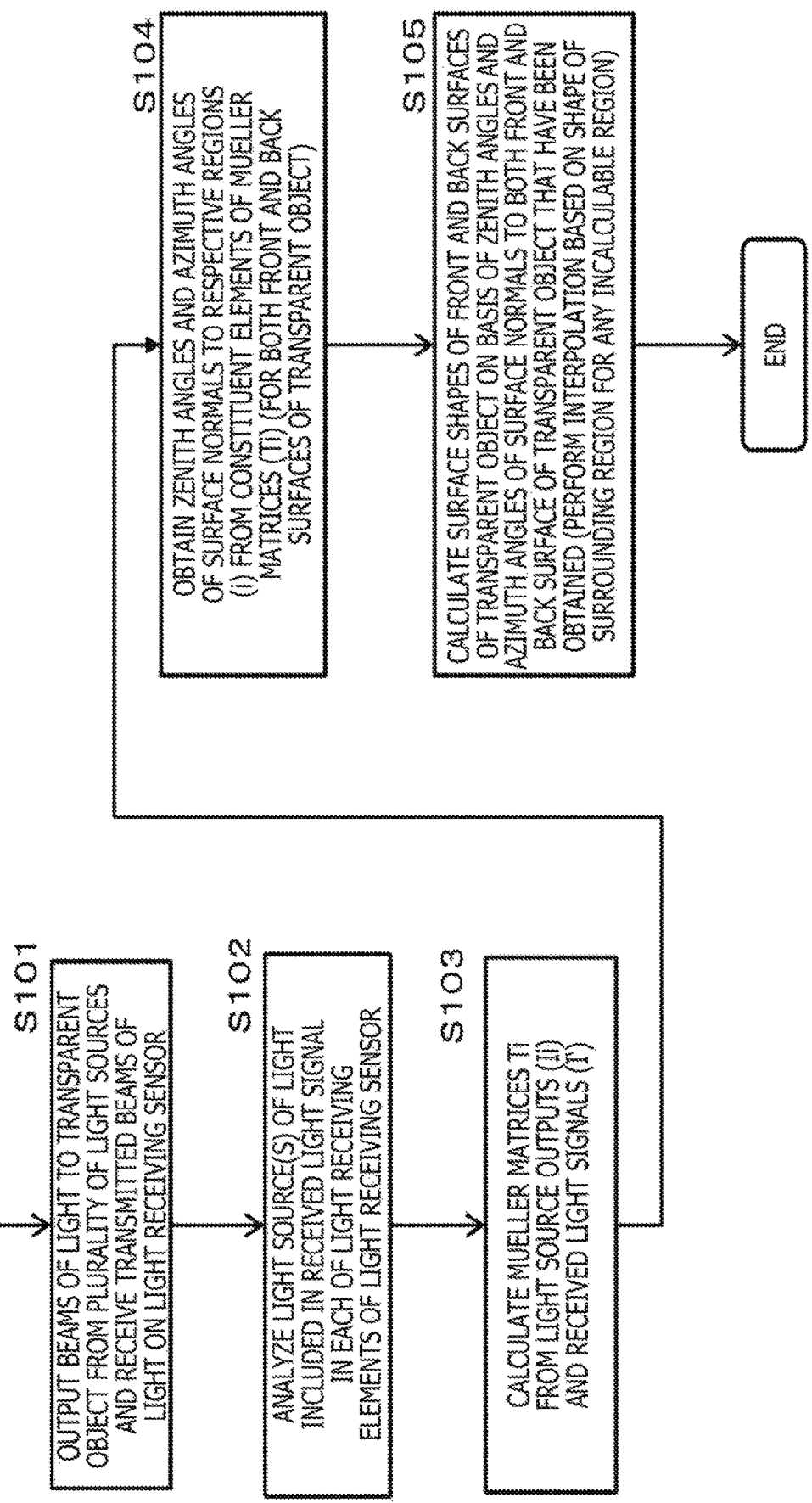
FIG. 6 is a diagram illustrating a flowchart for describing a process sequence for the process of measuring the shape of a transparent object.

It is noted that the process according to the flowchart illustrated in FIG. 6 is performed under a control section of the object shape measurement apparatus.

For example, under the control of the control section including a CPU and the like having a program execution function, the process according to the flowchart illustrated in FIG. 6 is performed according to a program stored in a storage section.

Hereinafter, a process in each step will be described.

(Step S101)

First, in step S101, beams of light are output from the plurality of light sources to a transparent object, and transmitted beams of light are received by the light receiving sensor.

It is noted that, as described above with reference to FIGS. 3 and 4, each of the plurality of light sources outputs a polarized beam of light set to change the polarization angle at a different speed.

Further, the settings satisfy the conditions for enabling the light source identification process described above.

(Step S102)

Next, in step S102, a light source(s) of light included in a received light signal in each of the light receiving elements of the light receiving sensor is(are) analyzed.

(Step S103)

Next, in step S103, the Mueller matrices Ti are calculated from light source outputs (Ii) and received light signals (I').

This is a process of deriving the calculation formula for T from the relational expression of (Formula 5) described above by applying (Formula 2) and (Formula 3) described above. That is, $$I' = T \cdot I \qquad \text{(Formula 2)}$$

$$T = I' \cdot I^{-1} \qquad \text{(Formula 3)}$$

In the above (Formula 2) and (Formula 3), the matrix T and the matrix I respectively represent the following matrices:

$$T = [T_1, T_2, \ldots, T_N]$$

$$I = [I_1, I_2, \ldots, I_N]^T$$

It is noted that the element $I_i$ of the matrix I represents a feature amount of a light source that emits a beam of light that is incident on the i-th front surface of the first surface (front surface) 10a of the transparent object 10, which is an object to be measured. In a case where (Formula 5) is used, the element $I_i$ of the matrix I represents a Stokes vector that represents the state of polarization of an output beam of light i that is output from the light source i.

The first component=$I_i$ represents the average light quantity of an output beam of light from the light source i (=a beam of light incident on the region i of the transparent object 10).

The second component=$I_{i,\ 90}$ represents a 90°-directional polarization component of the output beam of light from the light source i (=the beam of light incident on the region i of the transparent object 10).

The third component=$I_{i,\ 45}$ represents a 45°-directional polarization component of the output beam of light from the light source i (=the beam of light incident on the region i of the transparent object 10).

These values are known.

Meanwhile, I' represents a received light quantity in the above (Formula 2) and (Formula 3). In a case where (Formula 5) is used, I' represents a Stokes vector corresponding to I' (=a received light quantity) and represents a Stokes vector that represents the state of polarization of a beam(s) of light that has(have) passed through the transparent object 10 and that has(have) been detected by the light receiving sensor 30, which receives beams of light that have passed through the transparent object 10. That is, I' represents a matrix including the following components.

The first component=I' represents the average light quantity of a beam(s) of light that has(have) passed through the transparent object 10.

The second component=$I'_{90}$ represents a 90°-directional polarization component of the beam(s) of light that has (have) passed through the transparent object 10.

The third component=$I'_{45}$ represents a 45°-directional polarization component of the beam(s) of light that has (have) passed through the transparent object 10.

(Step S104)

Next, in step S104, the zenith angles and azimuth angles of the surface normals to the respective regions (i) are obtained from the constituent elements of the Mueller matrices (Ti). This process is performed for both the front and back surfaces of the transparent object.

That is, a process of calculating the following elements, which are the constituent elements of each Mueller matrix Ti, is performed.

$\theta_{i,1}$, and $\phi_{i,1}$ (the zenith angle and azimuth angle of the surface normal to the i-th front surface region of the first surface (front surface) 10a of the transparent object 10, which is an object to be measured)

$\theta_{i,2}$, and $\phi_{i,2}$ (the zenith angle and azimuth angle of the surface normal to the i-th back surface region of the second surface (back surface) 10b of the transparent object 10, which is an object to be measured)

(Step S105)

Next, in step S105, the surface shapes of the front and back surfaces of the transparent object are calculated on the basis of the zenith angles and azimuth angles of the surface normals to both the front and back surfaces of the transparent object that have been obtained in step S104. It should be noted that for any incalculable region, interpolation based on the shape of a surrounding region is performed.

In step S104, the zenith angle and azimuth angle of the surface normal to each divided region of the transparent object are calculated, as described above with reference to FIG. 2.

The surface shapes of the front and back surfaces of the transparent object are calculated by applying these pieces of information.

It should be noted that there is a possibility that the back surface regions of the transparent object may have a region that receives no output from any light source. For such a region, in some cases, the zenith angle and azimuth angle of the surface normal may not be able to be calculated.

For such a region, interpolation based on the shape of a surrounding region is performed to generate the entire surface shape.

2. Regarding Process of Measuring Thickness of Transparent Object

Next, a process of measuring the thickness of a transparent object will be described.

While the process described above is the process of measuring the surface shape of a transparent object, the object shape measurement apparatus according to the present disclosure is further capable of measuring the thickness of the transparent object.

Hereinafter, this process will be described.

The process of measuring the thickness of the transparent object 10 will be described with reference to FIG. 7.

Figure 7:
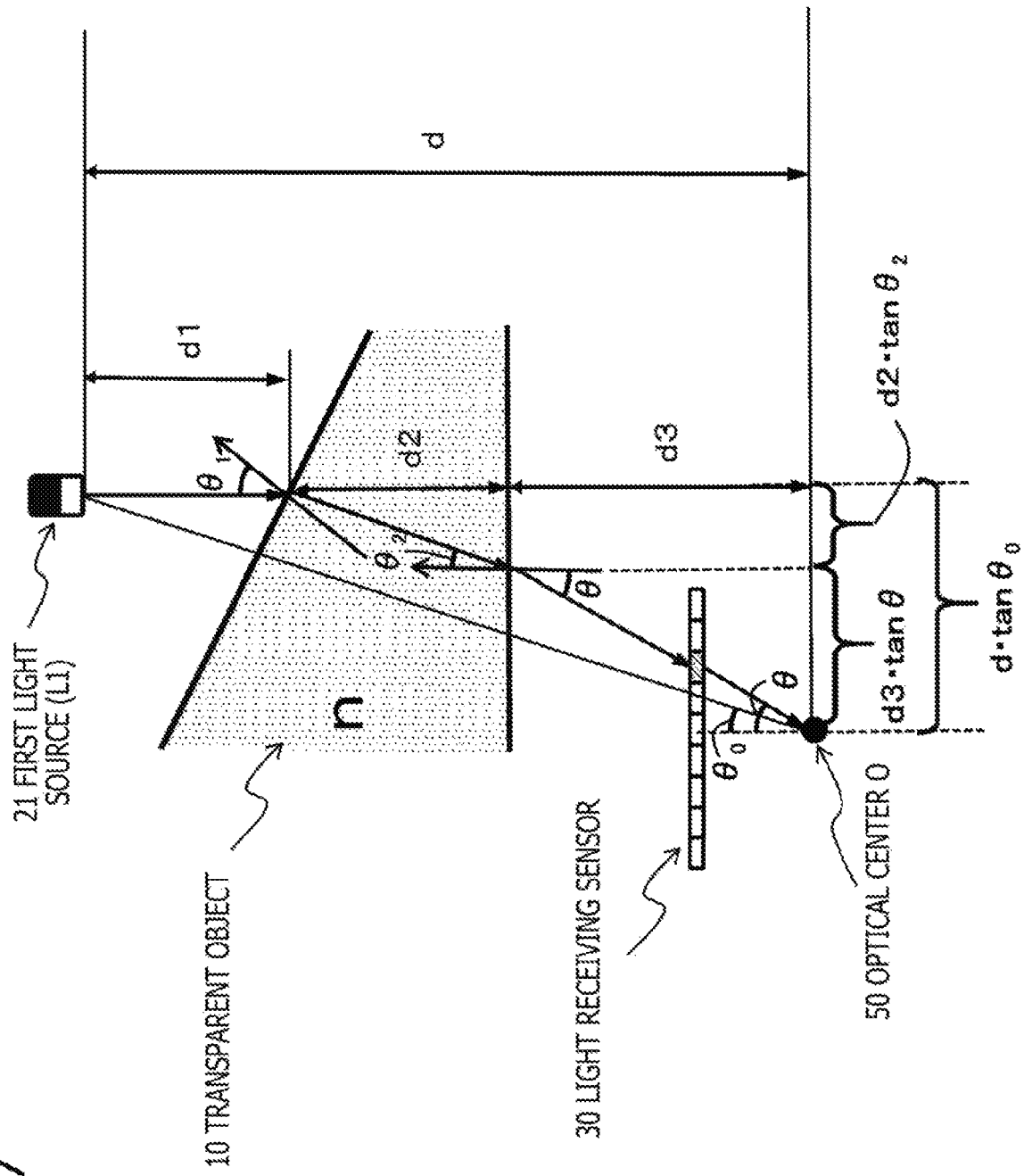
FIG. 7 is a diagram for describing an example of a process of measuring the thickness of a transparent object.

FIG. 7 illustrates the transparent object 10, the first light source (L1) 21, and the light receiving sensor 30.

An output beam of light from the first light source (L1) 21 passes through the transparent object 10 and is input into the light receiving sensor 30.

Here, as illustrated in FIG. 7, the zenith angle of the surface normal to the front surface of the transparent object 10 on the light source side is assumed to be θ1, and the zenith angle of the surface normal to the back surface on the light receiving sensor 30 side is assumed to be θ2.

Further, the incident angle of the beam of light that has passed through the transparent object 10 with respect to an optical center O, that is, an optical center O, 50, of the light receiving sensor 30 on the opposite side of the transparent object 10 is assumed to be θ. The optical center O, 50 is set at a perpendicular position extended from the center of the light receiving sensor 30.

Further, the distance between the optical center O, 50 and the first light source (L1) 21 is assumed to be d.

Further, the distance between the optical center O, 50 and the back surface of the transparent object 10 is assumed to be d3.

Further, the angle between the perpendicular extended from the center of the light receiving sensor 30 and a connection line between the light source and the optical center O, 50 is assumed to be θ0.

These are all known.

It is noted that the distances d and d3 are assumed to be distances in a direction parallel to the thickness direction of the transparent object.

It is noted that the zenith angle θ1 of the surface normal to the front surface of the transparent object 10 on the light source side and the zenith angle θ2 of the surface normal to the back surface on the light receiving sensor 30 side can be obtained by analyzing the shapes of the front and back surfaces of the transparent object (object to be measured) through the above-described process of measuring the surface shape.

Further, other parameters can be measured in advance.

As indicated at the bottom of FIG. 7, $$d \cdot \tan(\theta_0) = d_2 \cdot \tan(\theta_2) + d_3 \cdot \tan(\theta)$$

holds.

From this formula, the thickness d2 of the transparent object 10 can be calculated according to the following (Formula 7).

[Math. 5]

$$d_2 = \frac{d \cdot \tan(\theta_0) - d_3 \cdot \tan(\theta)}{\tan(\theta_2)} \quad \text{(Formula 7)}$$

Next, a sequence for measuring the thickness of a transparent object will be described with reference to a flowchart illustrated in FIG. 8.

Figure 8:
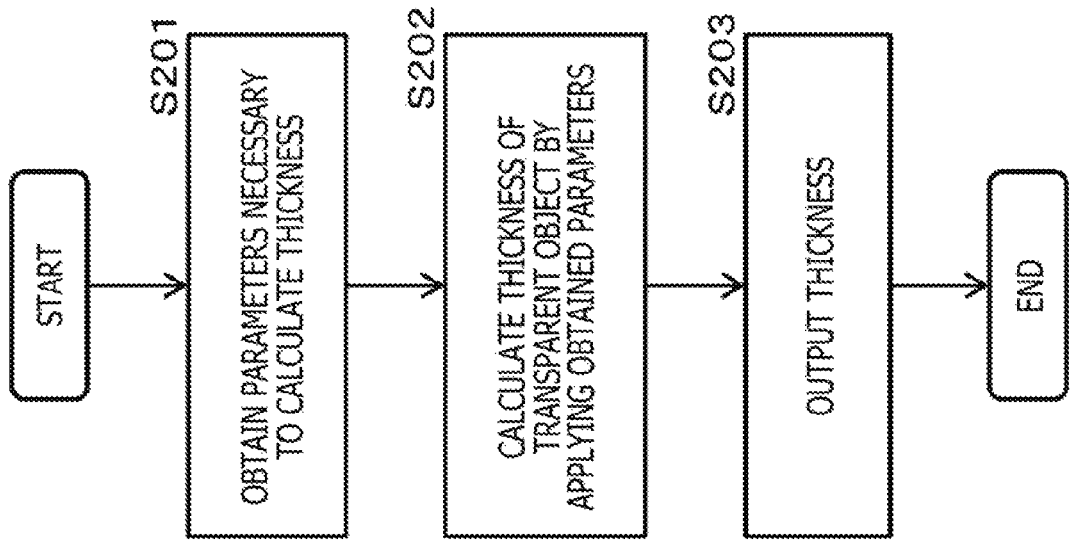
FIG. 8 is a diagram illustrating a flowchart for describing a process sequence for the process of measuring the thickness of a transparent object.

It is noted that the process according to the flowchart illustrated in FIG. 8 is performed under the control section of the object shape measurement apparatus.

For example, under the control of the control section including the CPU and the like having the program execution function, the process according to the flowchart illustrated in FIG. 8 is performed according to the program stored in the storage section.

Hereinafter, a process in each step will be described.

(Step S201)

First, the parameters necessary to calculate the thickness are obtained in step S201.

Specifically, these are the parameters described above with reference to FIG. 7.

That is, the following parameters are obtained:

the zenith angle $\theta2$ of the surface normal to the back surface of the transparent object 10 on the light receiving sensor 30 side;

the incident angle $\theta$ of a beam of light that has passed through the transparent object 10 with respect to the optical center O, 50 of the light receiving sensor 30 on the opposite side of the transparent object 10;

the distance d between the optical center O, 50 and the first light source (L1) 21;

the distance d3 between the optical center O, 50 and the back surface of the transparent object 10; and the angle $\theta0$ between the perpendicular extended from the center of the light receiving sensor 30 and the connection line between the light source and the optical center O, 50.

It is noted that the distances d and d3 are distances in the direction parallel to the thickness direction of the transparent object.

It is noted that among these parameters, the zenith angle $\theta2$ of the surface normal to the back surface of the transparent object 10 on the light receiving sensor 30 side can be obtained by analyzing the shapes of the front and back surfaces of the transparent object (object to be measured) through the above-described process of measuring the surface shape. The other parameters are measured and obtained in advance.

(Step S202)

Next, in step S202, the thickness of the transparent object is calculated by applying the obtained parameters.

This process is the process of calculating the thickness d2 according to the above (Formula 7).

(Step S203)

Next, in step S203, the thickness calculated in step S202 is output or stored in the storage section.

It is noted that the thickness is calculated for each divided region of the transparent object 10.

3. Regarding Configuration of Object Shape Measurement Apparatus that Measures Shape and Thickness of Transparent Object Next, a configuration of the object shape measurement apparatus that measures the shape and thickness of a transparent object will be described.

Figure 9:
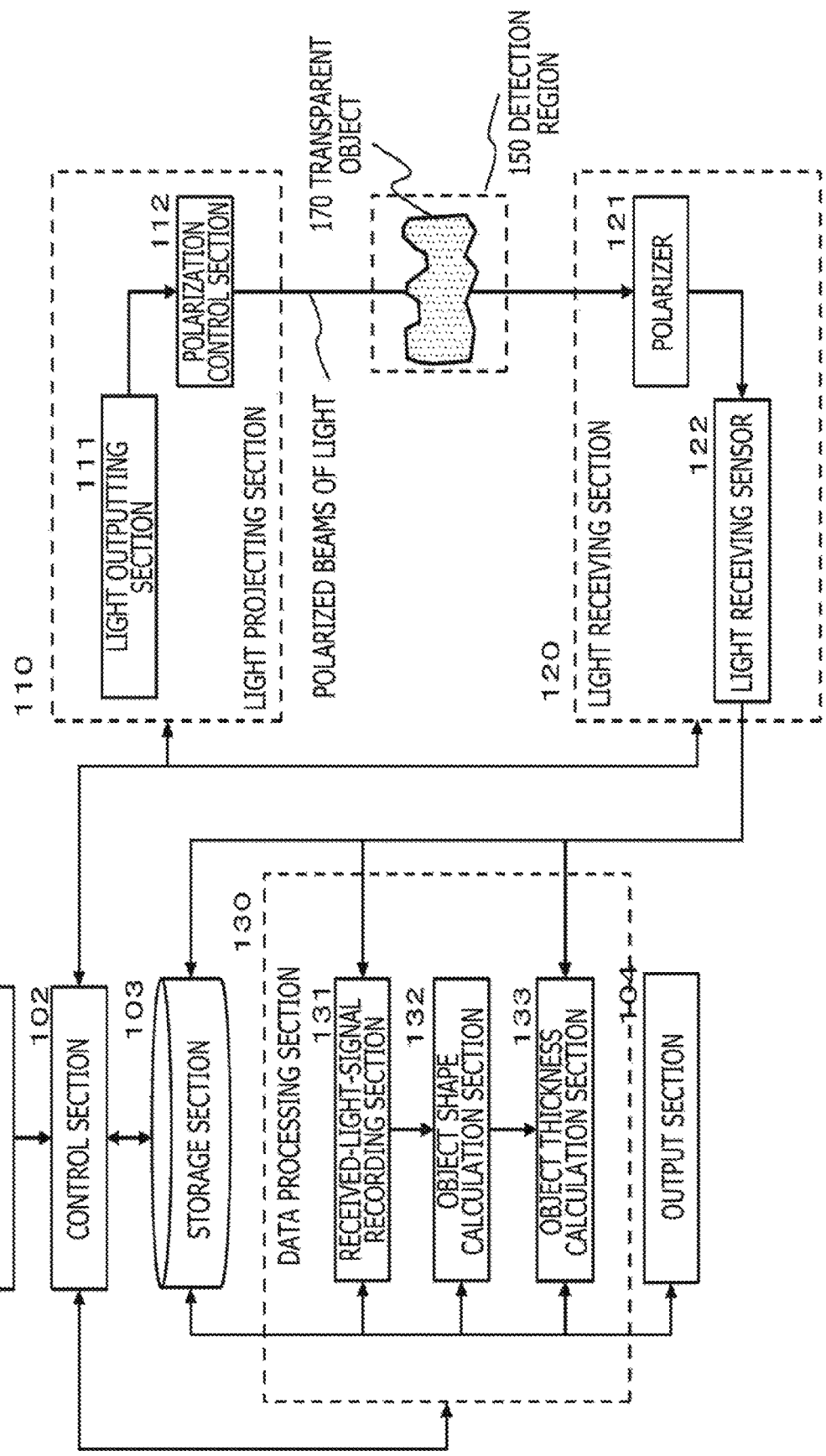
FIG. 9 is a diagram for describing an example of a configuration of an object shape measurement apparatus according to the present disclosure.

FIG. 9 is a block diagram illustrating an example of a configuration of an object shape measurement apparatus 100.

As illustrated in FIG. 9, the object shape measurement apparatus 100 includes an input section 101, a control section 102, a storage section 103, an output section 104, a light projecting section 110, a light receiving section 120, and a data processing section 130.

The light projecting section 110 outputs polarized beams of light. The polarized beams of light transmitted through a transparent object 170 in a detection region 150 are received by the light receiving section 120. The shape and thickness of the transparent object 170 in the detection region 150 are calculated on the basis of received light signals.

The input section 101 inputs mode setting information, information that serves as a trigger for process control, such as start or stop of a process, performed by a user, and the like. The mode setting information is, for example, a mode for measuring only the shape of an object, a mode for detecting the shape and thickness of an object, or the like.

In addition, the input section 101 is also used to input parameters necessary for processes such as polarization setting information to be used and threshold values and the like used for object detection, a stress calculation process, and the like, for example.

The control section 102 performs control and processes of the entire object shape measurement apparatus 100, performs control and processes of each constituent section, controls execution timings, and the like.

It is noted that the control section 102 includes a CPU and the like having a program execution function, for example, and performs control and processes according to a program stored in the storage section 103.

The storage section 103 stores data based on signals received by the light receiving section 120 and data generated and calculated by the data processing section 130.

Moreover, the storage section 103 is used as a region for storing parameters, reference values, and threshold values applied to data processes performed by the data processing section 130, the program executed by the control section 102, and the like.

The output section 104 outputs the results of the data processes performed by the data processing section 130, for example.

Specifically, the output section 104 outputs shape information and thickness information of the transparent object.

The light projecting section 110 includes a light outputting section 111 and a polarization control section 112.

The light projecting section 110 includes N light sources as described above with reference to FIGS. 1 to 5, and the individual light sources output respective polarized beams of light changed at different times.

A specific example of a configuration of the light projecting section 110 will be described in detail later.

The light receiving section 120 includes a polarizer 121 and a light receiving sensor 122.

The light receiving section 120 has a configuration for observing polarized beams of light that are beams of light that have passed through the transparent object 170 and that are based on the polarized beams of light output from the light projecting section 110.

A specific example of a configuration of the light receiving section 120 will be described in detail later.

The data processing section 130 includes a received-light-signal recording section 131, an object shape calculation section 132, and an object thickness calculation section 133.

The received-light-signal recording section 131 receives photoelectric conversion signals based on the beams of light received by the light receiving sensor 122 of the light receiving section 120, and analyzes the input signals necessary to calculate the shape and thickness of the transparent object 170 in the detection region 150.

The object shape calculation section 132 calculates the thickness of the transparent object 170 in the detection region 150 using signal values calculated by the received-light-signal recording section 131.

Specifically, the object shape calculation section 132 performs the process described with reference to FIGS. 1 to 6.

Specifically, the process of calculating the Mueller matrices Ti from the respective light source outputs (Ii) and the received light signals (I') and then calculating the following elements, which are the constituent elements of each of the Mueller matrices Ti, is performed.

$\theta_{i,1}$, and $\phi_{i,1}$ (the zenith angle and azimuth angle of the surface normal to the i-th front surface region of the first surface (front surface) 10a of the transparent object 10, which is an object to be measured)

$\theta_{i,2}$, and $\phi_{i,2}$ (the zenith angle and azimuth angle of the surface normal to the i-th back surface region of the second surface (back surface) 10b of the transparent object 10, which is an object to be measured)

It is noted that for any region for which the shape is incalculable, interpolation based on the shape of a surrounding region is performed as described above with reference to the flow in FIG. 6.

It is noted that when the light source identification process is performed on any beam of light input into one light receiving element of the light receiving sensor 122 of the light receiving section 120, the light source identification is performed by the process described above with reference to FIGS. 4 and 5.

The data of (2) light receiving element output in FIG. 5 described with reference to FIG. 5 are measured in advance in a preparation stage.

A reference table, which enables a light source(s) to be identified from the output of the light receiving element on the basis of the result of the measurement, is stored in the storage section 103 in advance.

For example, the reference table has a configuration illustrated in FIG. 10.

As illustrated in FIG. 10, a received light signal (=observed feature amount) in one light receiving element of the light receiving sensor is adjusted so as to be set differently depending on the combination of light sources. The correspondence relationship data are obtained in advance, and then stored in the storage section 103 of the object shape measurement apparatus 100 as the reference table.

The object shape calculation section 132 compares a received light signal obtained during the measurement of the shape of an actual transparent object with the reference table, and selects an entry for a registered received light signal (=observed feature amount) in the reference table that matches the measured received light signal. On the basis of the selected entry, the object shape calculation section 132 obtains light source combination data and identifies the light source(s).

The result of the shape calculation performed by the object shape calculation section 132 is output to the output section 104. Further, the result is stored in the storage section 103 as needed.

The object thickness calculation section 133 calculates the thickness of the transparent object 170 in the detection region 150 using the result of the calculation performed by the object shape calculation section 132.

This thickness calculation is performed according to the process described above with reference to FIGS. 7 and 8.

As described above, the parameters applied to this thickness calculation are the following parameters:

the zenith angle $\theta_2$ of the surface normal to the back surface of the transparent object 10 on the light receiving sensor 30 side;

the incident angle $\theta$ of a beam of light that has passed through the transparent object 10 with respect to the optical center O, 50 of the light receiving sensor 30 on the opposite side of the transparent object 10;

the distance d between the optical center O, 50 and the first light source (L1) 21;

the distance d3 between the optical center O, 50 and the back surface of the transparent object 10; and the angle $\theta_0$ between the perpendicular extended from the center of the light receiving sensor 30 and the connection line between the light source and the optical center O, 50.

These parameters are stored in the storage section 103.

It is noted that the distances d and d3 are distances in the direction parallel to the thickness direction of the transparent object.

It is noted that among these parameters, the zenith angle $\theta_2$ of the surface normal to the back surface of the transparent object on the light receiving sensor side uses the value calculated during the process of measuring the surface shape performed by the object shape calculation section 132. As for the other parameters, data measured and stored in advance in the storage section 103 are obtained and used.

Next, specific examples of the configurations of the light projecting section 110 and the light receiving section 120 will be described.

As described above, the light projecting section 110 includes the N light sources as described above with reference to FIGS. 1 to 5, and the individual light sources output respective polarized beams of light changed at different times.

Further, the light receiving section 120 has a configuration for observing polarized beams of light that are beams of light that have passed through the transparent object 170 and that are based on the polarized beams of light output from the light projecting section 110.

Hereinafter, multiple specific examples of the configurations of the light projecting section 110 and the light receiving section 120 will be described.

Figure 11:
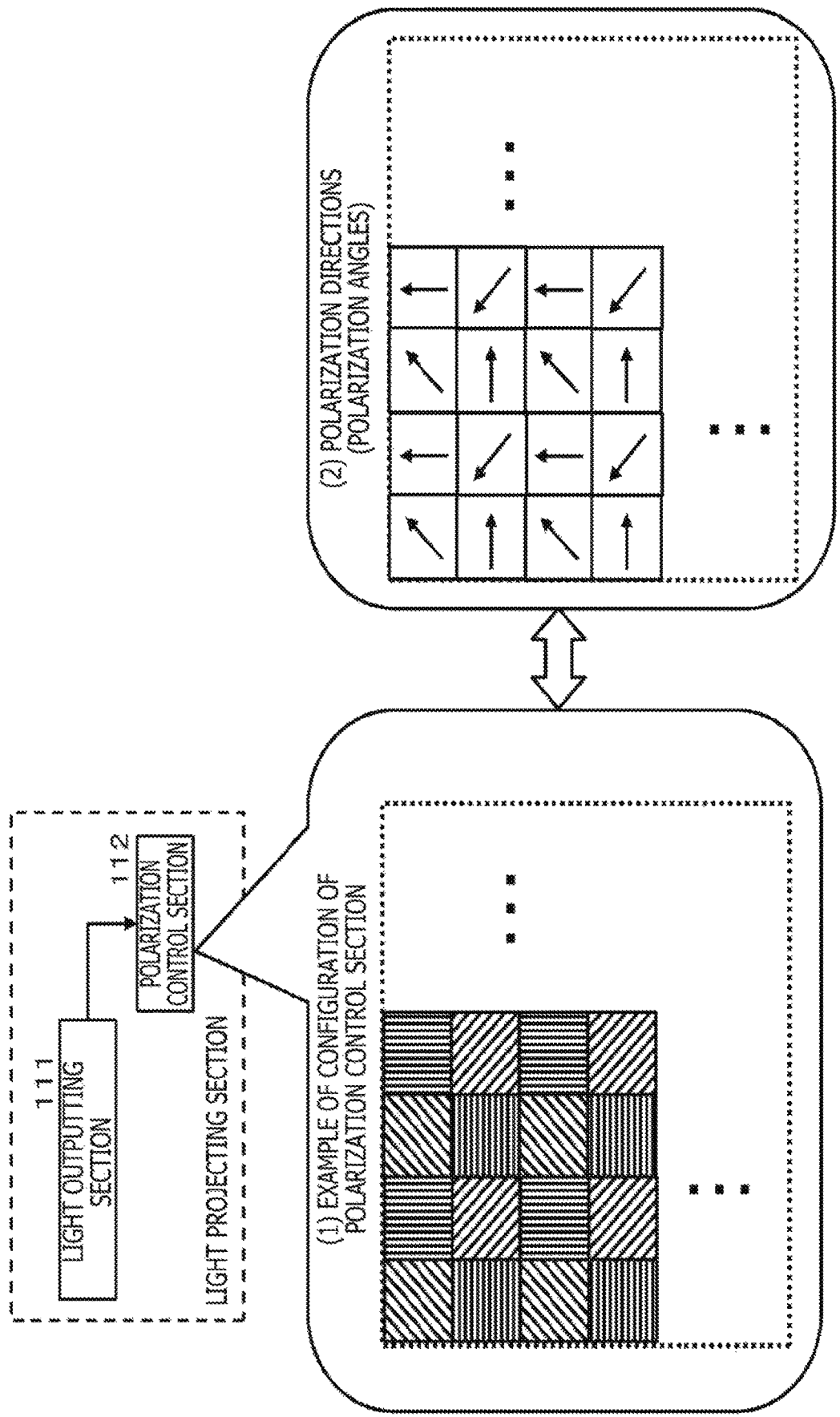
FIG. 11 is a diagram illustrating an example of a configuration of a light projecting section.

FIG. 11 is a diagram illustrating an example of the configuration of the light projecting section 110.

As illustrated in FIG. 11, the light projecting section 110 includes the light outputting section 111 and the polarization control section 112.

(1) of FIG. 11 illustrates a specific example of the configuration of the polarization control section 112.

As in the case of the light source 20 described above with reference to FIG. 2, the plurality of N light sources is illustrated in (1) of FIG. 11.

These individual light sources output respective polarized beams of light with various different phases.

Figure 12:
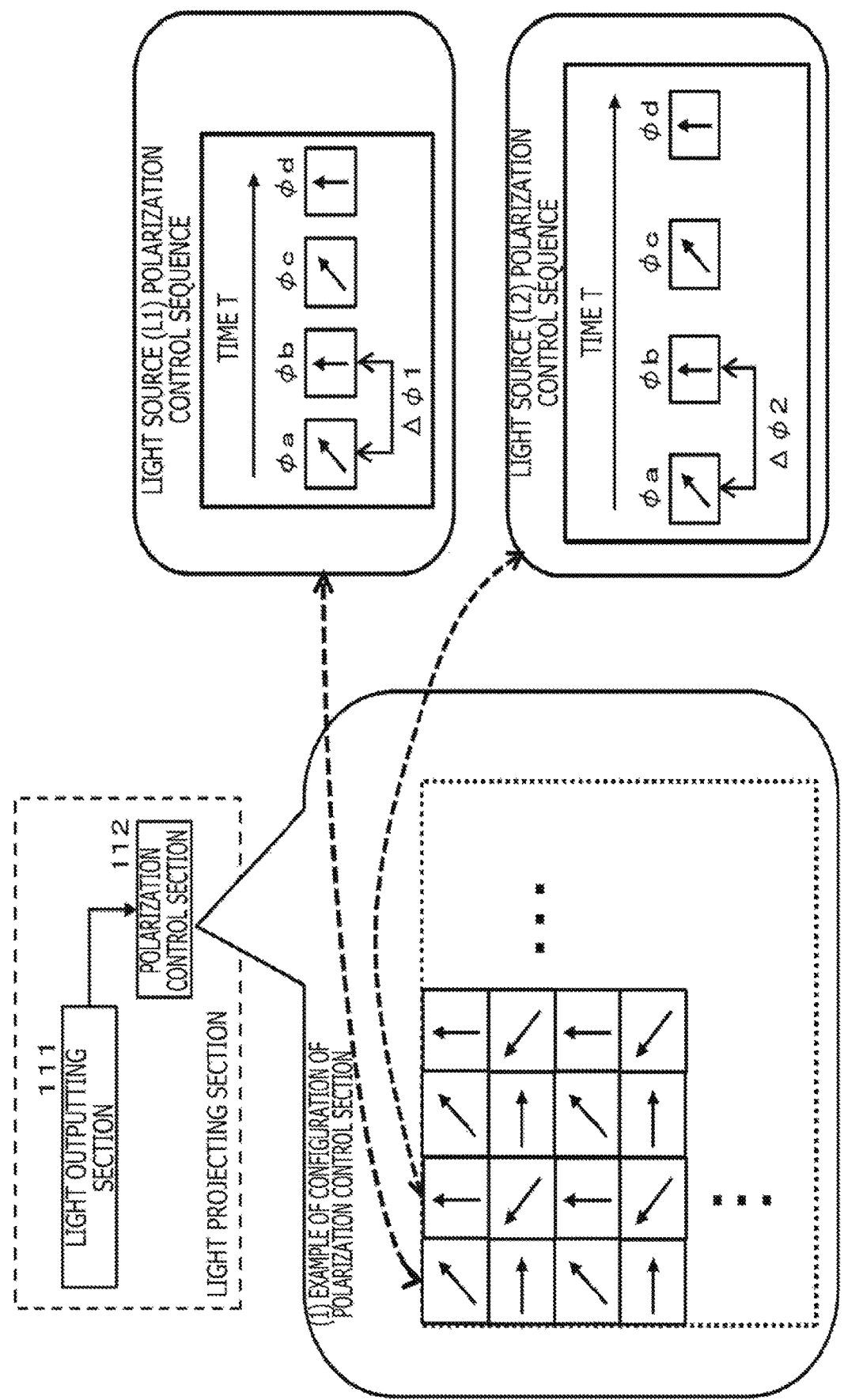
FIG. 12 is a diagram illustrating an example of a configuration of a light receiving section.

A specific example is illustrated in FIG. 12.

FIG. 12 illustrates an example of polarization control of two light sources to be controlled by the polarization control section 112.

This figure is similar to the example described above with reference to FIG. 4.

As for the control of the four types of polarization directions (45°, 0°, 135°, and 90°) in (1) first light source (L1) polarization control sequence, the time interval at which the polarization direction changes by 45° is assumed to be $\Delta\phi1$.

That is, in the example illustrated in the figure, the time at which the polarization direction changes from 45° to 0° is $\Delta\phi1$, the time at which the polarization direction changes from 0° to 135° is also $\Delta\phi1$, and the time at which the polarization direction changes from 135° to 90° is also $\Delta\phi1$.

Meanwhile, as for the control of the four types of polarization directions (45°, 0°, 135°, and 90°) in (2) second light source (L2) polarization control sequence, the time interval at which the polarization direction changes by 45° is assumed to be $\Delta\phi2$ ($\neq\Delta\phi1$).

That is, in the example illustrated in the figure, the time at which the polarization direction changes from 45° to 0° is Δϕ2, the time at which the polarization direction changes from 0° to 135° is also Δϕ2, and the time at which the polarization direction changes from 135° to 90° is also Δϕ2.

As described above, polarization control is performed with the settings that vary the time at which the state of a polarized beam of light from each light source changes. In this manner, even in a case where polarized beams of light from a plurality of light sources are input into one light receiving element of the light receiving sensor 30, it is possible to analyze a received light signal therein and identify the light sources of light included in the received light signal.

Next, an example of the configuration of the light receiving section 120 will be described with reference to FIG. 13.

The light receiving section 120 receives, through the transparent object, polarized beams of light from the plurality of different light sources that are output from the above-described light projecting section 110.

Figure 13:
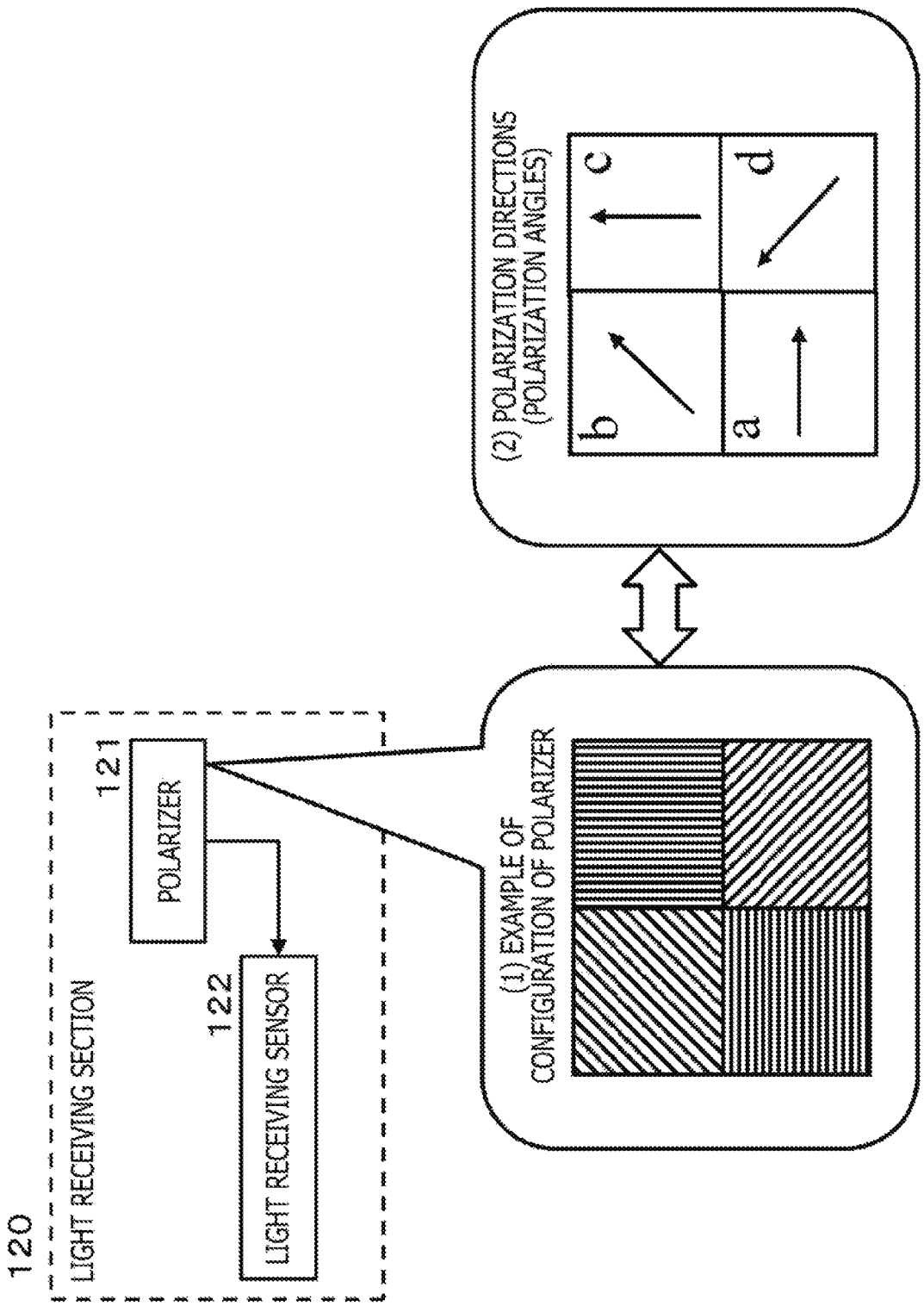
FIG. 13 is a diagram illustrating an example of the configuration of the light receiving section.
Figure 14:
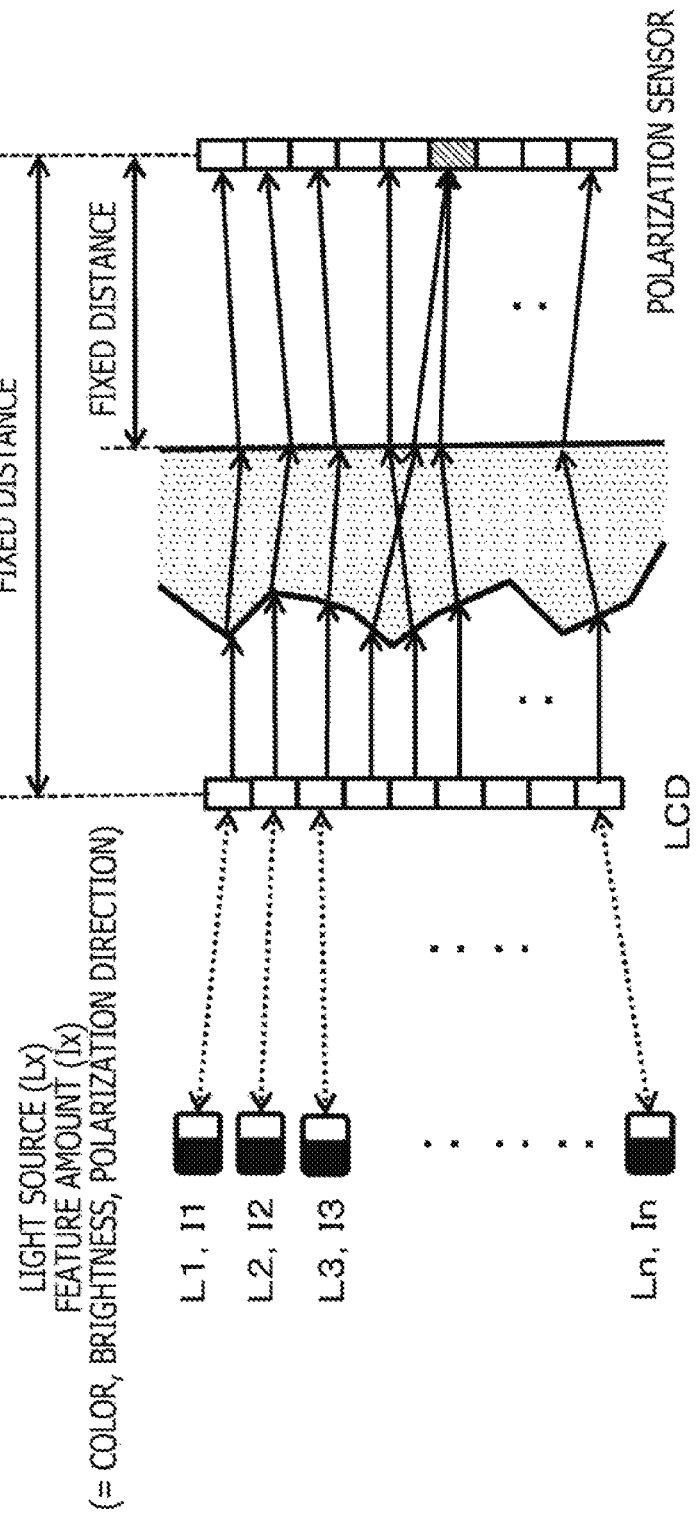
FIG. 14 is a diagram for describing an example of the configuration of the shape measurement apparatus according to the present disclosure.

As illustrated in FIG. 13, the light receiving section 120 has a configuration for obtaining the observed luminance I (θ) at each of a plurality of different observation polarization angles (θ) as an observed value, for example.

FIG. 13 is a diagram illustrating an example of the configuration of the light receiving section 120.

As illustrated in FIG. 13, the light receiving section 120 includes the polarizer 121 and the light receiving sensor 122.

(1) of FIG. 13 illustrates a specific example of a configuration of the polarizer 121.

As illustrated in (1) of FIG. 13, the polarizer 121 of the light receiving section 120 includes four types of polarizers with the four types of polarization directions (polarization angles) in combination.

This is a polarization sensor that can simultaneously obtain polarized beams of light in the four directions.

Specifically, the polarizers with the following four types of polarization directions (0°, 45°, 90°, and 135°) are included in combination.

In (2) of FIG. 13, the polarization directions (polarization angles) of the four polarizers are indicated by arrows.

As illustrated in the figure, a=polarization direction of 0°, b=polarization direction of 45°, c=polarization direction of 90°, and d=polarization direction of 135°.

The polarizer 121 includes the polarizers with the above four types of polarization directions (a to d) in combination.

Any light signal that has passed through the polarizer 121, which includes the polarizers with the above four types of polarization directions (a to d) in combination, is input into the light receiving sensor 122 and subjected to a photoelectric conversion process. In the photoelectric conversion process, the light signal is converted into an electric signal that corresponds to the light signal quantity (light intensity). The electric signal representing the light intensity is stored in the storage section 103 and input into the data processing section 130.

In this manner, the light receiving section 120 has a configuration for obtaining the observed luminance I (θ) at each of the four different observation polarization angles (θ) as the observed value.

The observed luminance I (θ), which is the observed value at each of the four different observation polarization angles (θ) received by the light receiving section 120, is stored in the storage section 103 and input into the data processing section 130.

The object shape calculation section 132 of the data processing section 130 performs the process of identifying a light source(s) that has(have) output a beam(s) of light input into each light receiving element of the light receiving sensor 122 and then calculates the shape of the object using the above-described (Formula 1), (Formula 5), and the like.

4. Regarding Other Embodiments

Next, other embodiments for measuring the shape of a transparent object will be described.

In the above embodiment, a description has been given of an embodiment in which when the process of measuring the shape of a transparent object is performed, the process of identifying a light source of any beam of light input into one light receiving element of the light receiving sensor is performed with the settings that vary the temporal change of a polarized beam of light from each light source.

A method other than the above-described method that varies the mode of temporal change of a polarized beam of light from each light source can be applied to the process of identifying a light source of any beam of light input into one light receiving element of the light receiving sensor.

One example is to vary the color, brightness, or polarization direction of each light source.

That is, colors, brightness, or polarization directions of the individual light sources are set to be different from each other.

At least one of the color, brightness, and polarization direction of each light source is set as the feature amount that is unique to each light source. With the settings above, a process of beams of light from a plurality of light sources identifying a light source of any beam of light input into one light receiving element of the light receiving sensor is performed.

Figure 15:
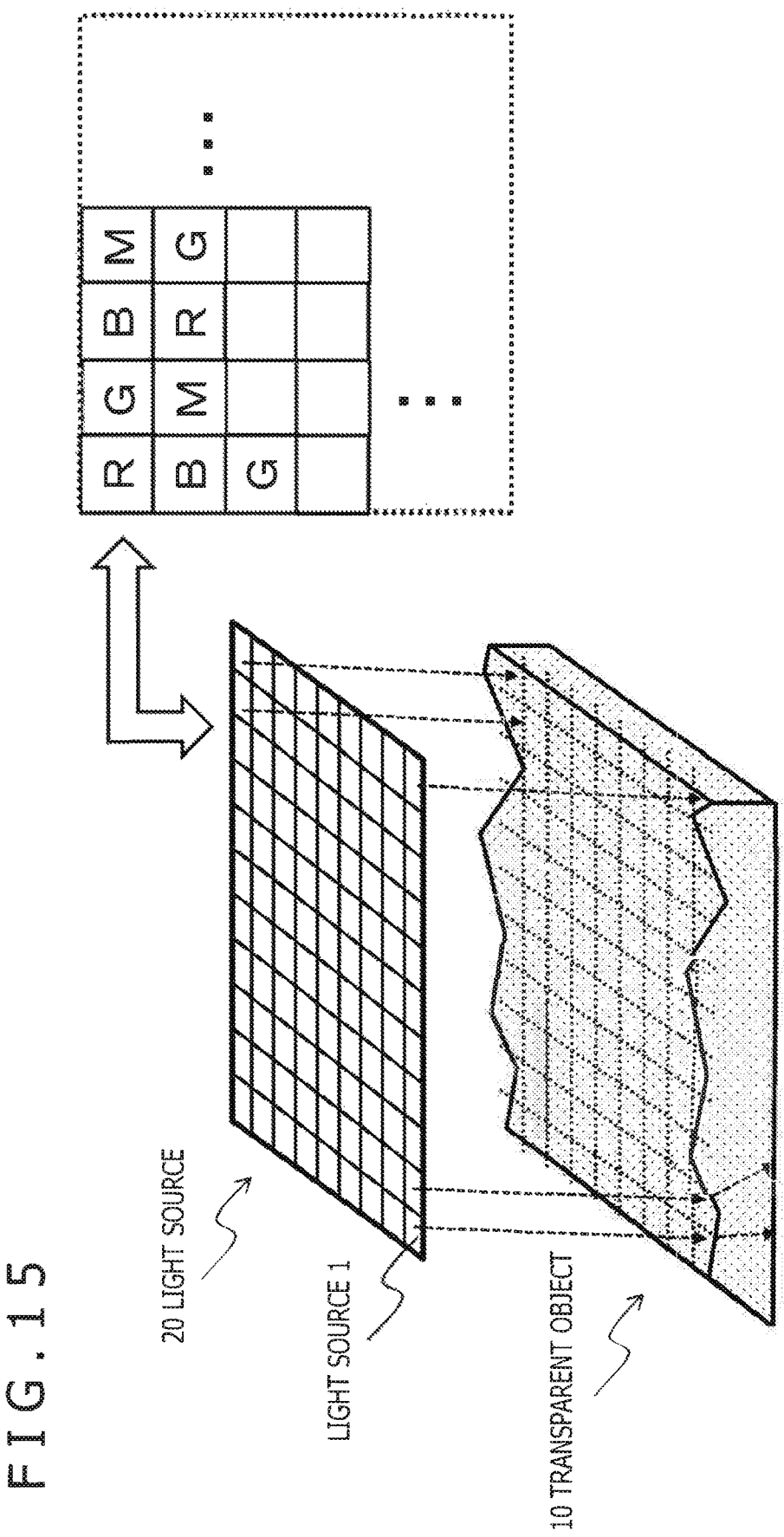
FIG. 15 is a diagram for describing an example of the configuration of the shape measurement apparatus according to the present disclosure.

FIG. 15 illustrates a setting in which the individual light sources i (i=1 to N) included in the light source 20 are assigned different colors.

It is noted that the colors of the light sources positioned apart from each other may be the same. This is because there is a low possibility that beams of light from the light sources positioned apart from each other pass through the transparent object and are input into the same light receiving element.

Figure 16:
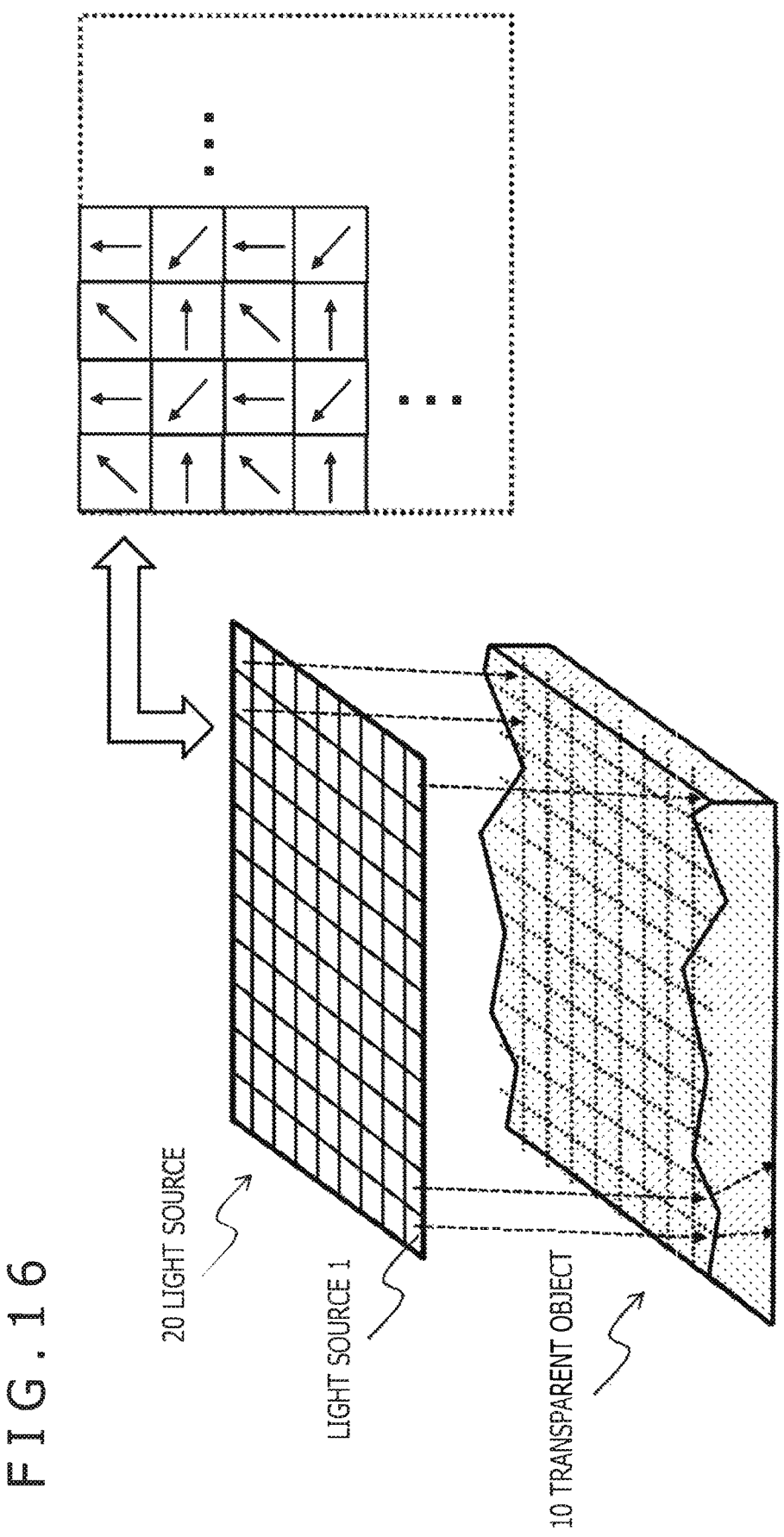
FIG. 16 is a diagram for describing an example of the configuration of the shape measurement apparatus according to the present disclosure.

FIG. 16 illustrates an example in which the individual light sources i (i=1 to N) included in the light source 20 are set to output polarized beams of light in different polarization directions.

It is noted that the polarization directions of the light sources positioned apart from each other may be the same. This is because there is a low possibility that beams of light from the light sources positioned apart from each other pass through the transparent object and are input into the same light receiving element.

FIG. 17 illustrates an example of a correspondence relationship between a received light signal (=observed feature amount) in one light receiving element of the light receiving sensor and a combination of light sources in a case where at least one of the color, brightness, and polarization direction of each light source is set as the feature amount unique to each light source in this manner.

As illustrated in FIG. 17, a received light signal (=observed feature amount) in one light receiving element of the light receiving sensor is adjusted so as to be set differently depending on the combination of light sources. The correspondence relationship data are obtained in advance, and then stored as a reference table in the storage section 103 of the object shape measurement apparatus 100.

A received light signal obtained during the measurement of the shape of an actual transparent object is compared with the reference table, and an entry for a registered received light signal (=observed feature amount) in the reference table that matches the measured received light signal is selected. On the basis of the selected entry, light source combination data are obtained. In this manner, the light source(s) can be identified.

5. Regarding Example of Hardware Configuration of Object Shape Measurement Apparatus Next, an example of a hardware configuration of the object shape measurement apparatus will be described with reference to FIG. 18.

It is noted that the hardware configuration illustrated in FIG. 18 is a block diagram illustrating the example of the hardware configuration that can be used as the object shape measurement apparatus described in the above embodiments.

A CPU (Central Processing Unit) 301 functions as a data processing section that performs various kinds of processes according to programs stored in a ROM (Read Only Memory) 302 or a storage section 308. For example, the CPU 301 performs the processes described in the above embodiments. A RAM (Random Access Memory) 303 stores programs to be executed by the CPU 301, data, and the like. The CPU 301, the ROM 302, and the RAM 303 are interconnected to each other by a bus 304.

The CPU 301 is connected to an input/output interface 305 via the bus 304. The input/output interface 305 is connected to an input section 306 and an output section 307. The input section 306 includes various kinds of switches, a keyboard, a mouse, a microphone, and the like. The output section 307 includes a display, a speaker, and the like.

The CPU 301 performs various kinds of processes in response to commands input from the input section 306 and outputs the results of the processes to, for example, the output section 307.

The storage section 308 connected to the input/output interface 305 includes, for example, a hard disk and the like, and stores the programs to be executed by the CPU 301 and various kinds of data. A communication section 309 functions as a transmission/reception section for data communication via a network such as the Internet or a local area network, and communicates with an external apparatus.

A drive 310 connected to the input/output interface 305 drives a removable medium 311 such as a magnetic disk, an optical disc, a magneto-optical disc, or a semiconductor memory such as a memory card to record or read data.

A light projecting section 321 corresponds to the light projecting section 110 of the object shape measurement apparatus illustrated in FIG. 9.

A light receiving section 322 corresponds to the light receiving section 120 of the object shape measurement apparatus illustrated in FIG. 9.

6. Summary of Configuration of Present Disclosure

The embodiments of the present disclosure have been described in detail above with reference to the specific embodiments. However, it is obvious that those skilled in the art can make modifications or substitutions to the embodiments without departing from the scope of the present disclosure. That is, the present invention has been disclosed in the form of exemplification and should not be construed in a limited manner. In order to determine the scope of the present disclosure, the claims should be taken into consideration.

It is noted that the technology disclosed in the present specification can have the following configurations.

(1) An object shape measurement apparatus including:

a light projecting section configured to output beams of light to a transparent object whose shape is to be measured;

a light receiving sensor including a plurality of light receiving elements configured to receive output beams of light that have been output from the light projecting section and that have passed through the transparent object; and a data processing section configured to analyze a received light signal in each of the light receiving elements of the light receiving sensor, in which the light projecting section outputs, in parallel, output beams of light from a plurality of light sources, and the data processing section performs a process of analyzing the received light signal in each of the light receiving elements of the light receiving sensor and identifying a light source of any beam of light input into one light receiving element by using light source combination information that is stored in a storage section and that corresponds to a value of the received light signal.

(2) The object shape measurement apparatus according to (1), in which the data processing section performs the process of identifying a light source of any beam of light input into one light receiving element by referring to a reference table recording correspondence data between values of received light signals in the light receiving elements and light source identifiers.

(3) The object shape measurement apparatus according to (1) or (2), in which each of the light sources included in the light projecting section outputs a polarized beam of light that is a result of changing a polarization direction of an output beam of light with passage of time, and at least adjacent light sources are set to be in different polarization control modes.

(4) The object shape measurement apparatus according to (3), in which the at least adjacent light sources among the light sources included in the light projecting section are set to change respective polarization directions at different speeds.

(5) The object shape measurement apparatus according to (1) or (2), in which colors, brightness, or polarization directions of output beams of light from at least adjacent light sources among the light sources included in the light projecting section are set to be different from each other.

(6) The object shape measurement apparatus according to any one of (1) to (5), in which the data processing section includes an object shape calculation section configured to calculate the shape of the transparent object by calculating a Mueller matrix representing a change in a state of a polarized beam of light output from each of the light sources of the light projecting section.

(7) The object shape measurement apparatus according to (6), in which the object shape calculation section calculates the shape of the transparent object by calculating, from matrix elements of the Mueller matrix, a zenith angle and an azimuth angle of a surface normal to each divided region on both front and back surfaces of the transparent object.

(8) The object shape measurement apparatus according to (6) or (7), in which the object shape calculation section calculates the shape of the transparent object by calculating a zenith angle and an azimuth angle of a surface normal to each divided region on both front and back surfaces of the transparent object on a basis of a relational expression among a feature amount I of each of the plurality of light sources included in the light projecting section, a received light signal I' in each of the light receiving elements of the light receiving sensor, and the Mueller matrix.

(9) The object shape measurement apparatus according to (8), in which, after the object shape calculation section identifies a light source of any beam of light input into one light receiving element by using a reference table recording correspondence data between values of received light signals in the light receiving elements and light source identifiers, the object shape calculation section calculates the shape of the transparent object by calculating the zenith angle and the azimuth angle of the surface normal to each divided region on both the front and back surfaces of the transparent object using the relational expression.

(10) The object shape measurement apparatus according to any one of (1) to (9), in which the data processing section includes
an object shape calculation section configured to calculate the shape of the transparent object, and
an object thickness calculation section configured to calculate a thickness of the transparent object using data calculated by the object shape calculation section.

(11) The object shape measurement apparatus according to (10), in which the object thickness calculation section calculates the thickness of the transparent object using, as calculation parameters, the data calculated by the object shape calculation section and data representing a positional relationship among the transparent object, the light sources included in the light projecting section, and the light receiving sensor.

(12) A light source identification method performed by an object shape measurement apparatus, the object shape measurement apparatus including a light projecting section including a plurality of light sources configured to output beams of light to a transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the light source identification method including:
by the data processing section,
performing a process of identifying a light source of any beam of light input into one light receiving element of the light receiving sensor by referring to a reference table recording correspondence data between values of received light signals in the light receiving elements and light source identifiers.

(13) A transparent object shape calculation method that is a method for calculating a shape of a transparent object, the transparent object shape calculation method being performed by an object shape measurement apparatus, the object shape measurement apparatus including a light projecting section including a plurality of light sources configured to output beams of light to the transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the transparent object shape calculation method including:
by the data processing section,
calculating the shape of the transparent object by calculating a Mueller matrix representing a change in a state of a polarized beam of light output from each of the light sources of the light projecting section and calculating, from matrix elements of the Mueller matrix, a zenith angle and an azimuth angle of a surface normal to each divided region on both front and back surfaces of the transparent object.

(14) A program that causes an object shape measurement apparatus to perform a light source identification process, the object shape measurement apparatus including a light projecting section including a plurality of light sources configured to output beams of light to a transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the program causing the data processing section to perform a process of identifying a light source of any beam of light input into one light receiving element of the light receiving sensor by referring to a reference table recording correspondence data between values of received light signals in the light receiving elements and light source identifiers.

(15) A program that causes an object shape measurement apparatus to perform a process of calculating a shape of a transparent object, the object shape measurement apparatus including a light projecting section including a plurality of light sources configured to output beams of light to the transparent object whose shape is to be measured, a light receiving sensor including a plurality of light receiving elements configured to receive output beams of light that have been output from the light projecting section and that have passed through the transparent object, and a data processing section configured to analyze a received light signal in each of the light receiving elements of the light receiving sensor, the program causing the data processing section to calculate the shape of the transparent object by calculating a Mueller matrix representing a change in a state of a polarized beam of light output from each of the light sources of the light projecting section and calculating, from matrix elements of the Mueller matrix, a zenith angle and an azimuth angle of a surface normal to each divided region on both front and back surfaces of the transparent object.

Further, the series of processes described in the specification can be performed by hardware, software, or a combination thereof. In a case where the processes are performed by software, a program having process sequences recorded thereon can be installed in a memory of a computer incorporated into dedicated hardware and then executed, or the program can be installed in a general-purpose computer capable of performing various kinds of processes and then executed. For example, the program can be recorded on a recording medium in advance. The program can be installed from the recording medium to the computer. Alternatively, the program can be received through a network, such as a LAN (Local Area Network) or the Internet, and then installed in a recording medium, such as a built-in hard disk drive.

It is noted that various kinds of processes described in the specification may not only be performed in chronological order according to the description but also be performed in parallel or individually in accordance with the processing capability of the apparatus performing the processes or when needed. Further, in the present specification, a system refers to a configuration in which a plurality of apparatuses is logically grouped and is not limited to a configuration in which individually configured apparatuses are provided in the same housing.

INDUSTRIAL APPLICABILITY

As described above, according to the configuration of an embodiment of the present disclosure, an apparatus and method for measuring the shape and thickness of a transparent object are implemented.

Specifically, for example, a light projecting section configured to output beams of light to a transparent object; a light receiving sensor configured to receive the beams of light that have passed through the transparent object; and a data processing section configured to analyze a received light signal in each light receiving element of the light receiving sensor are included. The light projecting section outputs, in parallel, output beams of light from a plurality of light sources, and the data processing section analyzes the received light signal in each light receiving element of the light receiving sensor and identifies a light source of any beam of light input into one light receiving element by using light source combination information that is stored in a storage section and that corresponds to a value of the received light signal. Moreover, shapes of both front and back surfaces of the transparent object are calculated by calculating a Mueller matrix representing a change in a state of a polarized beam of light output from each of the light sources of the light projecting section.

With this configuration, the apparatus and method for measuring the shape and thickness of a transparent object are implemented.

REFERENCE SIGNS LIST

10 Transparent object
20 Light source
21 First light source (L1)
22 Second light source (L2)
30 Light receiving sensor
31 Light receiving element
50 Optical center
100 Object shape measurement apparatus
101 Input section
102 Control section
103 Storage section
104 Output section
110 Light projecting section
111 Light outputting section
112 Polarization control section
120 Light receiving section
121 Polarizer
122 Light receiving sensor
130 Data processing section
131 Received-light-signal recording section
132 Object shape calculation section
133 Object thickness calculation section
150 Detection region
170 Transparent object
301 CPU
302 ROM
303 RAM
304 Bus
305 Input/output interface
306 Input section
307 Output section
308 Storage section
309 Communication section
310 Drive
311 Removable medium
321 Light projecting section
322 Light receiving section

The invention claimed is:

1. An object shape measurement apparatus comprising:
a light projecting section configured to output beams of light to a transparent object whose shape is to be measured;
a light receiving sensor including a plurality of light receiving elements configured to receive the output beams of light that have been output from the light projecting section and that have passed through the transparent object; and
a data processing section configured to analyze a received light signal in each of the light receiving elements of the light receiving sensor, wherein
the light projecting section outputs, in parallel, the output beams of light from a plurality of light sources, and
the data processing section performs a process of analyzing the received light signal in each of the light receiving elements of the light receiving sensor and identifying a light source of any beam of light input into one light receiving element by using light source combination information that is stored in a storage section and that corresponds to a value of the received light signal.

2. The object shape measurement apparatus according to claim 1,
wherein the data processing section performs the process of identifying a light source of any beam of light input into one light receiving element by referring to a reference table recording correspondence data between values of received light signals in the light receiving elements and light source identifiers.

3. The object shape measurement apparatus according to claim 1,
wherein each of the light sources included in the light projecting section outputs a polarized beam of light that is a result of changing a polarization direction of an output beam of light with passage of time, and
at least adjacent light sources are set to be in different polarization control modes.

4. The object shape measurement apparatus according to claim 3,
   wherein the at least adjacent light sources among the light sources included in the light projecting section are set to change respective polarization directions at different speeds.

5. The object shape measurement apparatus according to claim 1, wherein colors, brightness, or polarization directions of the output beams of light from at least adjacent light sources among the light sources included in the light projecting section are set to be different from each other.

6. The object shape measurement apparatus according to claim 1,
   wherein the data processing section includes an object shape calculation section configured to calculate the shape of the transparent object by calculating a Mueller matrix representing a change in a state of a polarized beam of light output from each of the light sources of the light projecting section.

7. The object shape measurement apparatus according to claim 6,
   wherein the object shape calculation section calculates the shape of the transparent object by calculating, from matrix elements of the Mueller matrix, a zenith angle and an azimuth angle of a surface normal to each divided region on both front and back surfaces of the transparent object.

8. The object shape measurement apparatus according to claim 6,
   wherein the object shape calculation section calculates the shape of the transparent object by calculating a zenith angle and an azimuth angle of a surface normal to each divided region on both front and back surfaces of the transparent object on a basis of a relational expression among a feature amount I of each of the plurality of light sources included in the light projecting section, a received light signal I' in each of the light receiving elements of the light receiving sensor, and the Mueller matrix.

9. The object shape measurement apparatus according to claim 8,
   wherein, after the object shape calculation section identifies a light source of any beam of light input into one light receiving element by using a reference table recording correspondence data between values of received light signals in the light receiving elements and light source identifiers, the object shape calculation section calculates the shape of the transparent object by calculating the zenith angle and the azimuth angle of the surface normal to each divided region on both the front and back surfaces of the transparent object using the relational expression.

10. The object shape measurement apparatus according to claim 1,
    wherein the data processing section includes
      an object shape calculation section configured to calculate the shape of the transparent object, and
      an object thickness calculation section configured to calculate a thickness of the transparent object using data calculated by the object shape calculation section.

11. The object shape measurement apparatus according to claim 10,
    wherein the object thickness calculation section calculates the thickness of the transparent object using, as calculation parameters, the data calculated by the object shape calculation section and data representing a positional relationship among the transparent object, the light sources included in the light projecting section, and the light receiving sensor.

12. A light source identification method performed by an object shape measurement apparatus, the object shape measurement apparatus including
    a light projecting section including a plurality of light sources configured to output beams of light to a transparent object whose shape is to be measured,
    a light receiving sensor including a plurality of light receiving elements configured to receive the output beams of light that have been output from the light projecting section and that have passed through the transparent object, and
    a data processing section configured to analyze a received light signal in each of the light receiving elements of the light receiving sensor,
    the light source identification method comprising:
      by the data processing section,
      performing a process of identifying a light source of any beam of light input into one light receiving element of the light receiving sensor by referring to a reference table recording correspondence data between values of received light signals in the light receiving elements and light source identifiers.

13. A transparent object shape calculation method that is a method for calculating a shape of a transparent object, the transparent object shape calculation method being performed by an object shape measurement apparatus, the object shape measurement apparatus including
    a light projecting section including a plurality of light sources configured to output beams of light to the transparent object whose shape is to be measured,
    a light receiving sensor including a plurality of light receiving elements configured to receive the output beams of light that have been output from the light projecting section and that have passed through the transparent object, and
    a data processing section configured to analyze a received light signal in each of the light receiving elements of the light receiving sensor,
    the transparent object shape calculation method comprising:
      by the data processing section,
      calculating the shape of the transparent object by calculating a Mueller matrix representing a change in a state of a polarized beam of light output from each of the light sources of the light projecting section and calculating, from matrix elements of the Mueller matrix, a zenith angle and an azimuth angle of a surface normal to each divided region on both front and back surfaces of the transparent object.

14. A program that causes an object shape measurement apparatus to perform a light source identification process, the object shape measurement apparatus including
    a light projecting section including a plurality of light sources configured to output beams of light to a transparent object whose shape is to be measured,
    a light receiving sensor including a plurality of light receiving elements configured to receive the output beams of light that have been output from the light projecting section and that have passed through the transparent object, and
    a data processing section configured to analyze a received light signal in each of the light receiving elements of the light receiving sensor, the program causing the data processing section to perform a process of identifying a light source of any beam of light input into one light receiving element of the light receiving sensor by referring to a reference table recording correspondence data between values of received light signals in the light receiving elements and light source identifiers.

15. A program that causes an object shape measurement apparatus to perform a process of calculating a shape of a transparent object, the object shape measurement apparatus including
- a light projecting section including a plurality of light sources configured to output beams of light to the transparent object whose shape is to be measured,
- a light receiving sensor including a plurality of light receiving elements configured to receive the output beams of light that have been output from the light projecting section and that have passed through the transparent object, and
- a data processing section configured to analyze a received light signal in each of the light receiving elements of the light receiving sensor, the program causing the data processing section to calculate the shape of the transparent object by calculating a Mueller matrix representing a change in a state of a polarized beam of light output from each of the light sources of the light projecting section and calculating, from matrix elements of the Mueller matrix, a zenith angle and an azimuth angle of a surface normal to each divided region on both front and back surfaces of the transparent object.

* * * * *